(12) United States Patent
Koberstein et al.

(10) Patent No.: US 10,343,487 B2
(45) Date of Patent: Jul. 9, 2019

(54) VEHICLE HEATING AND COOLING SYSTEM AND CONTROL METHOD

(71) Applicant: FORD GLOBAL TECHNOLOGIES, LLC, Dearborn, MI (US)

(72) Inventors: Manfred Koberstein, Troy, MI (US); Angelo Patti, Pleasant Ridge, MI (US); Loren John Lohmeyer, III, Monroe, MI (US); Jing He, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 15/801,673

(22) Filed: Nov. 2, 2017

(65) Prior Publication Data

US 2018/0312035 A1 Nov. 1, 2018

Related U.S. Application Data

(63) Continuation-in-part of application No. 15/499,548, filed on Apr. 27, 2017, now Pat. No. 10,183,549.

(51) Int. Cl.
*B60H 1/00* (2006.01)

(52) U.S. Cl.
CPC ..... *B60H 1/00899* (2013.01); *B60H 1/00278* (2013.01); *B60H 1/00385* (2013.01);
(Continued)

(58) Field of Classification Search
CPC ............ B60H 1/00899; B60H 1/00385; B60H 1/00278; B60H 2001/00307;
(Continued)

(56) References Cited

U.S. PATENT DOCUMENTS 6,640,889 B1 * 11/2003 Harte .................. B60H 1/00885
165/202
6,915,649 B2 * 7/2005 Amaral .............. B60H 1/00907
62/244
(Continued)

FOREIGN PATENT DOCUMENTS

| CN | 103612570 | | 3/2014 |
| EP | 1302731 | A1 | 4/2003 |
| EP | 2923867 | A1 | 9/2015 |

OTHER PUBLICATIONS

English machine translation of EP1302731.
(Continued)

*Primary Examiner* — Emmanuel E Duke
(74) *Attorney, Agent, or Firm* — Vichit Chea; King & Schickli, PLLC

(57) ABSTRACT

A vehicle having a heating and cooling system includes a refrigerant loop having first and second heat exchangers, and a coolant loop. The coolant loop includes a plurality of valves directing a first flow of coolant through a first refrigerant-to-coolant heat exchanger, a second flow of coolant through a second refrigerant-to-coolant heat exchanger, and a third flow of coolant including a first portion of the first flow of coolant exiting the first refrigerant-to-coolant heat exchanger and a first portion of the second flow of coolant exiting the second refrigerant-to-coolant heat exchanger through an auxiliary coolant loop, and a control module for controlling the plurality of valves to direct the flows of coolant dependent upon a mode of operation. The auxiliary coolant loop is for heating/cooling one or more components, such as a battery, dependent upon the mode of operation.

21 Claims, 27 Drawing Sheets

(52) U.S. Cl.
CPC .............. *B60H 2001/00307* (2013.01); *B60H 2001/00928* (2013.01)

(58) Field of Classification Search
CPC .......... B60H 2001/00928; B60H 1/323; B60H 1/00907; B60H 1/00885; B60H 1/00328; B60H 1/00007; B60H 1/00921
See application file for complete search history.

(56) References Cited

U.S. PATENT DOCUMENTS

| | | |
|---|---|---|
| 7,841,431 B2 | 11/2010 | Zhou |
| 2003/0164001 A1* | 9/2003 | Vouzelaud ......... B60H 1/00885 62/244 |
| 2005/0061497 A1 | 3/2005 | Amaral et al. |
| 2013/0283838 A1 | 10/2013 | Kadle et al. |
| 2016/0082805 A1 | 3/2016 | Graaf et al. |

OTHER PUBLICATIONS

English machine translation of CN103612570.
Warzyniak et al, "Holistic Thermal Management of Electric Vehicles" Mahle Behr GmbH & Co. KG, TD1.1DT, Matthias Jung, May 17, 2016.

* cited by examiner

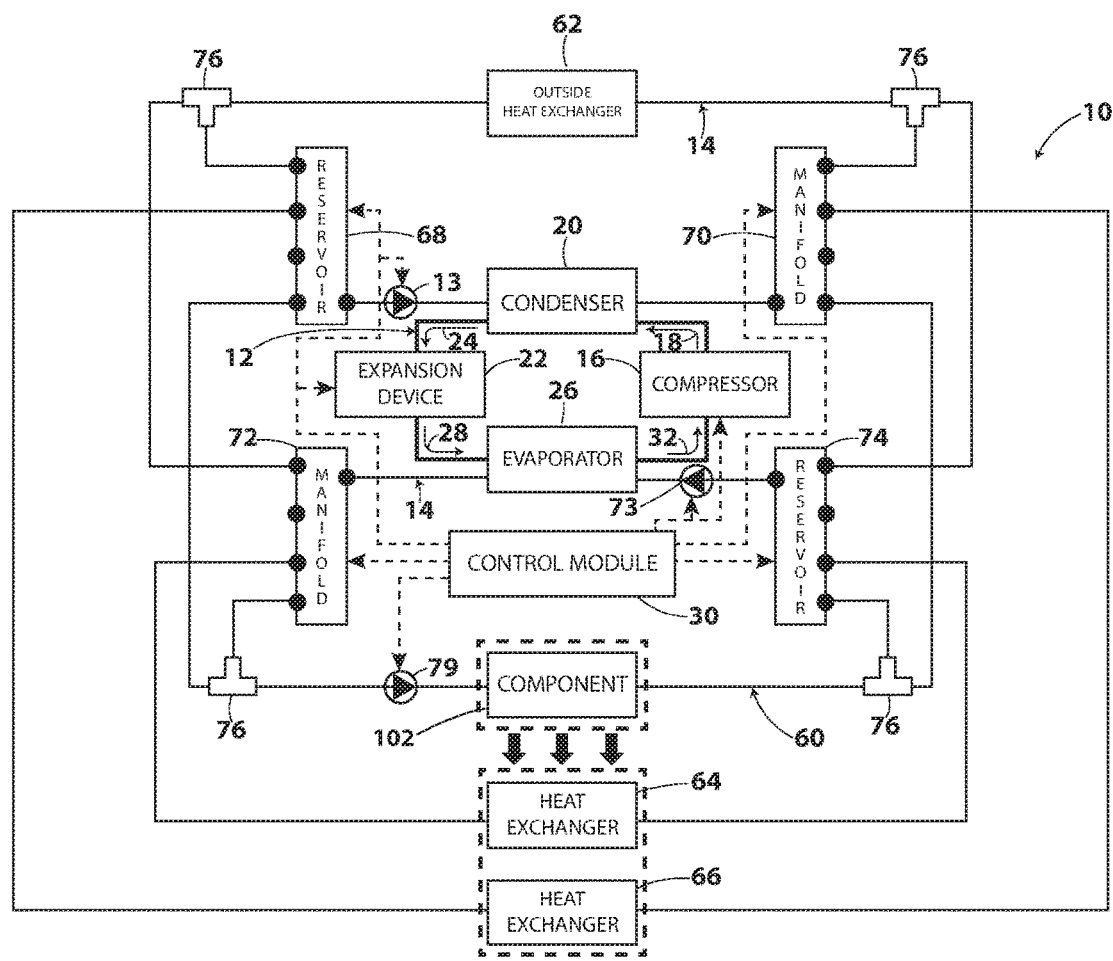

US 10,343,487 B2

VEHICLE HEATING AND COOLING SYSTEM AND CONTROL METHOD

This is a continuation-in-part application of U.S. patent application Ser. No. 15/499,548 (now U.S. Pat. No. 10,183,549) filed on Apr. 27, 2017.

TECHNICAL FIELD

This document relates generally to vehicle heating and cooling systems, and more specifically to a heating and cooling system with an optional thermal management system.

BACKGROUND

Driven by direct and indirect legislations, electrification will be required for compliance in the future automotive world. For hybrid and electric vehicles, heat pump systems represent a proven solution to extend the driving range of electrified vehicles and hold significant potential in meeting the increasing demands on electrification. Compared to heating methods using high voltage positive temperature coefficient (HV-PTC) heaters or phase-change material (PCM) heat storage, for example, a heat pump system may extend the driving range by up to 30% (FTP drive cycle at −10□C; supplier data).

The commonly used air-to-air heat pump systems demonstrate the highest energy efficiency. Such systems, however, involve sophisticated controls and increased costs due in part to the addition of refrigerant valves. Even more, there are certain potential safety risks associated with such systems that circulate refrigerant through cabin heat exchangers. In the event of an evaporator breach when the natural refrigerant R744 (carbon dioxide) is used, for example, such a breach could pose health threats to vehicle occupants due to elevated levels of $CO_2$ concentration in the passenger compartment.

Secondary loop heat pump systems, on the other hand, provide a relatively simple architecture that supports simpler controls and is cost effective. Overall, potential safety risks are minimized because no refrigerant is circulated through cabin heat exchangers. In addition, a secondary loop heat pump typically uses less refrigerant charge than a similar size air-to-air heat pump. This could represent a significant cost saving for R1234yf systems where the refrigerant itself is relatively expensive. While these systems overcome many of the noted issues associated with other systems, secondary loop systems are generally less efficient due primarily to heat transfers occurring indirectly between ambient air and passenger compartment air.

Given the noted and distinct advantages of secondary loop heat pump systems, a need exists for such a system that is capable of dynamic, adaptive control for improved energy efficiency. Such a system might may be sufficient to eliminate HV-PTC heaters for the passenger compartment and HV-PTC heaters for warming vehicle components (e.g., one or more batteries) making such systems a more competitive solution for use in vehicle climate control and thermal management.

SUMMARY OF THE INVENTION

In accordance with the purposes and benefits described herein, a vehicle having a heating, ventilation, and air conditioning (HVAC) system for heating and cooling a passenger compartment and components (e.g. a battery pack) is provided. The HVAC system may be broadly described as comprising a refrigerant loop having first and second refrigerant-to-coolant heat exchangers, a coolant loop having a plurality of valves for directing a first flow of coolant through the first refrigerant-to-coolant heat exchanger, a second flow of coolant through the second refrigerant-to-coolant heat exchanger, and a third flow of coolant including at least one of a first portion of the first flow of coolant exiting the first refrigerant-to-coolant heat exchanger and a first portion of the second flow of coolant exiting the second refrigerant-to-coolant heat exchanger through an auxiliary coolant loop, and a control module for controlling the plurality of valves to direct the flows of coolant dependent upon a mode of operation.

In another possible embodiment, each of the plurality of valves is a three-way valve.

In still another possible embodiment, the plurality of air-to-coolant heat exchangers includes at least an outside heat exchanger, and first and second passenger compartment heat exchangers.

In yet another possible embodiment, the first flow of coolant is warmed within the first refrigerant-to-coolant heat exchanger and (1) the first portion of the first flow of coolant exiting the first refrigerant-to-coolant heat exchanger is directed through a first valve of the plurality of valves to the auxiliary coolant loop and (2) a second portion of the first flow of coolant exiting the first refrigerant-to-coolant heat exchanger is directed through the first valve of the plurality of valves to a first of the plurality of air-to-coolant heat exchangers for cooling the second portion of the first flow of coolant, and wherein the second flow of coolant is cooled within the second refrigerant-to-coolant heat exchanger and (1) the first portion of the second flow of coolant exiting the second refrigerant-to-coolant heat exchanger is directed through a fifth valve of the plurality of valves to the auxiliary coolant loop and (2) a second portion of the second flow of coolant exiting the second refrigerant-to-coolant heat exchanger is directed through the fifth valve of the plurality of valves to a second air-to-coolant heat exchanger for lowering a temperature within the passenger compartment, in a cooling mode of operation.

In one other possible embodiment, the first flow of coolant is warmed within the first refrigerant-to-coolant heat exchanger and (1) the first portion of the first flow of coolant exiting the first refrigerant-to-coolant heat exchanger is directed through a first valve of the plurality of valves to the auxiliary coolant loop and (2) a second portion of the first flow of coolant exiting the first refrigerant-to-coolant heat exchanger is directed through the first valve of the plurality of valves to a third air-to-coolant heat exchanger for raising a temperature within the passenger compartment, and wherein the second flow of coolant is cooled within the second refrigerant-to-coolant heat exchanger and (1) the first portion of the second flow of coolant exiting the second refrigerant-to-coolant heat exchanger is directed through a fifth valve of the plurality of valves to the auxiliary coolant loop and (2) a second portion of the second flow of coolant exiting the second refrigerant-to-coolant heat exchanger is directed through a fourth valve of the plurality of valves to a first air-to-coolant heat exchanger for warming the second flow of coolant, in a first heating mode of operation.

In another possible embodiment, the first flow of coolant is warmed within the first refrigerant-to-coolant heat exchanger and (1) the first portion of the first flow of coolant exiting the first refrigerant-to-coolant heat exchanger is directed through a first valve of the plurality of valves to the auxiliary coolant loop and (2) a second portion of the first flow of coolant exiting the first refrigerant-to-coolant heat exchanger is directed through the first valve of the plurality of valves to a third air-to-coolant heat exchanger for raising a temperature within the passenger compartment, and wherein the second flow of coolant is cooled within the second refrigerant-to-coolant heat exchanger and is directed through a fourth valve of the plurality of valves to the first air-to-coolant heat exchanger for warming the second flow of coolant, in a second heating mode of operation.

In yet still another possible embodiment, the first flow of coolant is warmed within the first refrigerant-to-coolant heat exchanger and (1) the first portion of the first flow of coolant exiting the first refrigerant-to-coolant heat exchanger is directed through a first valve of the plurality of valves to the auxiliary coolant loop, (2) a second portion of the first flow of coolant exiting the first refrigerant-to-coolant heat exchanger is directed through a second valve of the plurality of valves to a third air-to-coolant heat exchanger for raising a temperature within the passenger compartment, and (3) a third portion of the first flow of coolant exiting the first refrigerant-to-coolant heat exchanger is directed through the second valve of the plurality of valves to a first air-to-coolant heat exchanger for lowering a temperature of the third portion of the first flow of coolant, and wherein the second flow of coolant is cooled within the second refrigerant-to-coolant heat exchanger and (1) the first portion of the second flow of coolant exiting the second refrigerant-to-coolant heat exchanger is directed through a fifth valve of the plurality of valves to the auxiliary coolant loop and (2) a second portion of the second flow of coolant exiting the second refrigerant-to-coolant heat exchanger is directed through the fifth valve of the plurality of valves to a second air-to-coolant heat exchanger for dehumidifying and lowering a temperature of the passenger compartment, in a first dehumidification and re-heat mode of operation.

In one other possible embodiment, the first flow of coolant is warmed within the first refrigerant-to-coolant heat exchanger and (1) the first portion of the first flow of coolant exiting the first refrigerant-to-coolant heat exchanger is directed through a first valve of the plurality of valves to the auxiliary coolant loop, (2) a second portion of the first flow of coolant exiting the first refrigerant-to-coolant heat exchanger is directed through the first valve of the plurality of valves to a third air-to-coolant heat exchanger for raising a temperature within the passenger compartment, and wherein the second flow of coolant is cooled within the second refrigerant-to-coolant heat exchanger and (1) the first portion of the second flow of coolant exiting the second refrigerant-to-coolant heat exchanger is directed through a fifth valve of the plurality of valves to the auxiliary coolant loop, (2) a second portion of the second flow of coolant exiting the second refrigerant-to-coolant heat exchanger is directed through a fifth valve of the plurality of valves to a second air-to-coolant heat exchanger for dehumidifying and lowering a temperature of the passenger compartment, and (3) a third portion of the second flow of coolant exiting the second refrigerant-to-coolant heat exchanger is directed through a fourth valve of the plurality of valves to a first air-to-coolant heat exchanger for warming the third portion of the second flow of coolant, in a second dehumidification and re-heat mode of operation.

In another possible embodiment, the first flow of coolant is warmed within the first refrigerant-to-coolant heat exchanger and (1) the first portion of the first flow of coolant exiting the first refrigerant-to-coolant heat exchanger is directed through a first valve of the plurality of valves to the auxiliary coolant loop, and (2) a second portion of the first flow of coolant exiting the first refrigerant-to-coolant heat exchanger is directed through the first valve of the plurality of valves to a third air-to-coolant heat exchanger for raising a temperature within the passenger compartment, and wherein the second flow of coolant is cooled within the second refrigerant-to-coolant heat exchanger and (1) the first portion of the second flow of coolant exiting the second refrigerant-to-coolant heat exchanger is directed through a fifth valve of the plurality of valves to the auxiliary coolant loop and (2) a second portion of the second flow of coolant exiting the second refrigerant-to-coolant heat exchanger is directed through the fifth valve of the plurality of valves to a second air-to-coolant heat exchanger for dehumidifying and lowering a temperature of the passenger compartment, in a third dehumidification and re-heat mode of operation.

In a different possible embodiment, the a vehicle having a heating and cooling system includes a refrigerant loop having first and second refrigerant-to-coolant heat exchangers, a coolant loop having a plurality of valves for directing a first portion of a first flow of coolant warmed within the first refrigerant-to-coolant heat exchanger through an auxiliary coolant loop and a first portion of a second flow of coolant cooled within the second refrigerant-to-coolant heat exchanger through the auxiliary coolant loop, and a control module for controlling the plurality of valves to direct the first and second flows of coolant dependent upon a mode of operation.

In another possible embodiment, the plurality of valves includes at least one four-way valve.

In still another possible embodiment, the plurality of air-to-coolant heat exchangers includes at least an outside heat exchanger, and first and second passenger compartment heat exchangers.

In yet another possible embodiment, (1) the first portion of the first flow of coolant warmed within the first refrigerant-to-coolant heat exchanger is directed through a first valve of the plurality of valves to the auxiliary coolant loop and (2) a second portion of the first flow of coolant warmed within the first refrigerant-to-coolant heat exchanger is directed through the first valve of the plurality of valves to a first air-to-coolant heat exchanger for cooling the first flow of coolant, and wherein (1) the first portion of the second flow of coolant cooled within the second refrigerant-to-coolant heat exchanger is directed through a third valve of the plurality of valves to the auxiliary coolant loop and (2) a second portion of the second flow of coolant cooled within the second refrigerant-to-coolant heat exchanger is directed through the third valve of the plurality of valves to a second air-to-coolant heat exchanger for lowering a temperature within the passenger compartment, in a cooling mode of operation.

In one other possible embodiment, (1) the first portion of the first flow of coolant warmed within the first refrigerant-to-coolant heat exchanger is directed through a first valve of the plurality of valves to the auxiliary coolant loop and (2) a second portion of the first flow of coolant warmed within the first refrigerant-to-coolant heat exchanger is directed through the first valve of the plurality of valves to a third air-to-coolant heat exchanger for raising a temperature within the passenger compartment, and wherein (1) the first portion of the second flow of coolant cooled within the second refrigerant-to-coolant heat exchanger is directed through a third valve of the plurality of valves to the auxiliary coolant loop and (2) a second portion of the second flow of coolant cooled within the second refrigerant-to-coolant heat exchanger is directed through the third valve of the plurality of valves to a first air-to-coolant heat exchanger for warming the second flow of coolant, in a first heating mode of operation.

In another possible embodiment, (1) the first portion of the first flow of coolant warmed within the first refrigerant-to-coolant heat exchanger is directed through a first valve of the plurality of valves to the auxiliary coolant loop and (2) a second portion of the first flow of coolant warmed within the first refrigerant-to-coolant heat exchanger is directed through the first valve of the plurality of valves to a third air-to-coolant heat exchanger for raising a temperature within the passenger compartment, and wherein a second portion of the second flow of coolant cooled within the second refrigerant-to-coolant heat exchanger includes the entirety of the second flow of coolant cooled within the second refrigerant-to-coolant heat exchanger and is directed through the third valve of the plurality of valves to the first air-to-coolant heat exchanger for warming the second flow of coolant, in a second heating mode of operation.

In still another possible embodiment, (1) the first portion of the first flow of coolant warmed within the first refrigerant-to-coolant heat exchanger is directed through a first valve of the plurality of valves to the auxiliary coolant loop, (2) a second portion of the first flow of coolant warmed within the first refrigerant-to-coolant heat exchanger is directed through the first valve of the plurality of valves to a third air-to-coolant heat exchanger for raising a temperature within the passenger compartment, and (3) a third portion of the first flow of coolant warmed within the first refrigerant-to-coolant heat exchanger is directed through the first valve of the plurality of valves to a first air-to-coolant heat exchanger for lowering a temperature of the third portion of the first flow of coolant, and wherein (1) a first portion of the second flow of coolant cooled within the second refrigerant-to-coolant heat exchanger is directed through a third valve of the plurality of valves to the auxiliary coolant loop and (2) a second portion of the second flow of coolant cooled within the second refrigerant-to-coolant heat exchanger is directed through the second valve of the plurality of valves to a second air-to-coolant heat exchanger for dehumidifying and cooling the passenger compartment, in a first dehumidification and re-heat mode of operation.

In one other possible embodiment, the first flow of coolant is warmed within the first refrigerant-to-coolant heat exchanger and (1) the first portion of the first flow of coolant warmed within the first refrigerant-to-coolant heat exchanger is directed through a first valve of the plurality of valves to the auxiliary coolant loop and (2) a second portion of the first flow of coolant warmed within the first refrigerant-to-coolant heat exchanger is directed through the first valve of the plurality of valves to a third air-to-coolant heat exchanger for raising a temperature within the passenger compartment, and wherein the second flow of coolant is cooled within the second refrigerant-to-coolant heat exchanger and (1) the first portion of the second flow of coolant cooled within the second refrigerant-to-coolant heat exchanger is directed through a third valve of the plurality of valves to the auxiliary coolant loop, (2) a second portion of the second flow of coolant cooled within the second refrigerant-to-coolant heat exchanger is directed through the third valve of the plurality of valves to a second air-to-coolant heat exchanger for dehumidifying and lowering a temperature of the passenger compartment, and (3) a third portion of the second flow of coolant cooled within the second refrigerant-to-coolant heat exchanger is directed through the third valve of the plurality of valves to a first air-to-coolant heat exchanger for warming the third portion of the second flow of coolant, in a second dehumidification and re-heat mode of operation.

In another possible embodiment, (1) the first portion of the first flow of coolant warmed within the first refrigerant-to-coolant heat exchanger is directed through a first valve of the plurality of valves to the auxiliary coolant loop, and (2) a second portion of the first flow of coolant warmed within the first refrigerant-to-coolant heat exchanger is directed through the first valve of the plurality of valves to a third air-to-coolant heat exchanger for raising a temperature within the passenger compartment, and wherein (1) the first portion of the second flow of coolant cooled within the second refrigerant-to-coolant heat exchanger is directed through a third valve of the plurality of valves to the auxiliary coolant loop and (2) a second portion of the second flow of coolant cooled within the second refrigerant-to-coolant heat exchanger is directed through the third valve of the plurality of valves to a second air-to-coolant heat exchanger for dehumidifying and cooling the passenger compartment, in a third dehumidification and re-heat mode of operation.

In accordance with the purposes and benefits described herein, a method is provided of heating and cooling a passenger compartment in a vehicle. The method may be broadly described as comprising the steps of: (a) cycling a refrigerant through a refrigerant loop having first and second refrigerant-to-coolant heat exchangers; (b) directing a first coolant flow through the first refrigerant-to-coolant heat exchanger and a second coolant flow through the second refrigerant-to-coolant heat exchanger within a coolant loop; and (c) adjusting a temperature of a third coolant flow through an auxiliary coolant loop including the component by blending a first portion of the first coolant flow warmed within the first refrigerant-to-coolant heat exchanger and a first portion of the second coolant flow cooled within the second refrigerant-to-coolant heat exchanger to form the third coolant flow.

In another possible embodiment, the method further includes the step of controlling at least one of the directing and adjusting steps dependent upon a mode of operation.

In still another possible embodiment, the second portion of the second flow of coolant cooled within the second refrigerant-to-coolant heat exchanger includes the entirety of the second flow of coolant cooled within the second refrigerant-to-coolant heat exchanger in a heating mode of operation.

In the following description, there are shown and described several embodiments of a vehicle heating and cooling system with a thermal management system and related methods of heating and cooling a passenger compartment in the vehicle. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle heating and cooling system with a thermal management system and related methods and together with the description serve to explain certain principles thereof. In the drawing figures:

FIG. 1 is a schematic diagram of a vehicle heating and cooling system having a refrigerant loop and a secondary, coolant loop;

Figure 26:
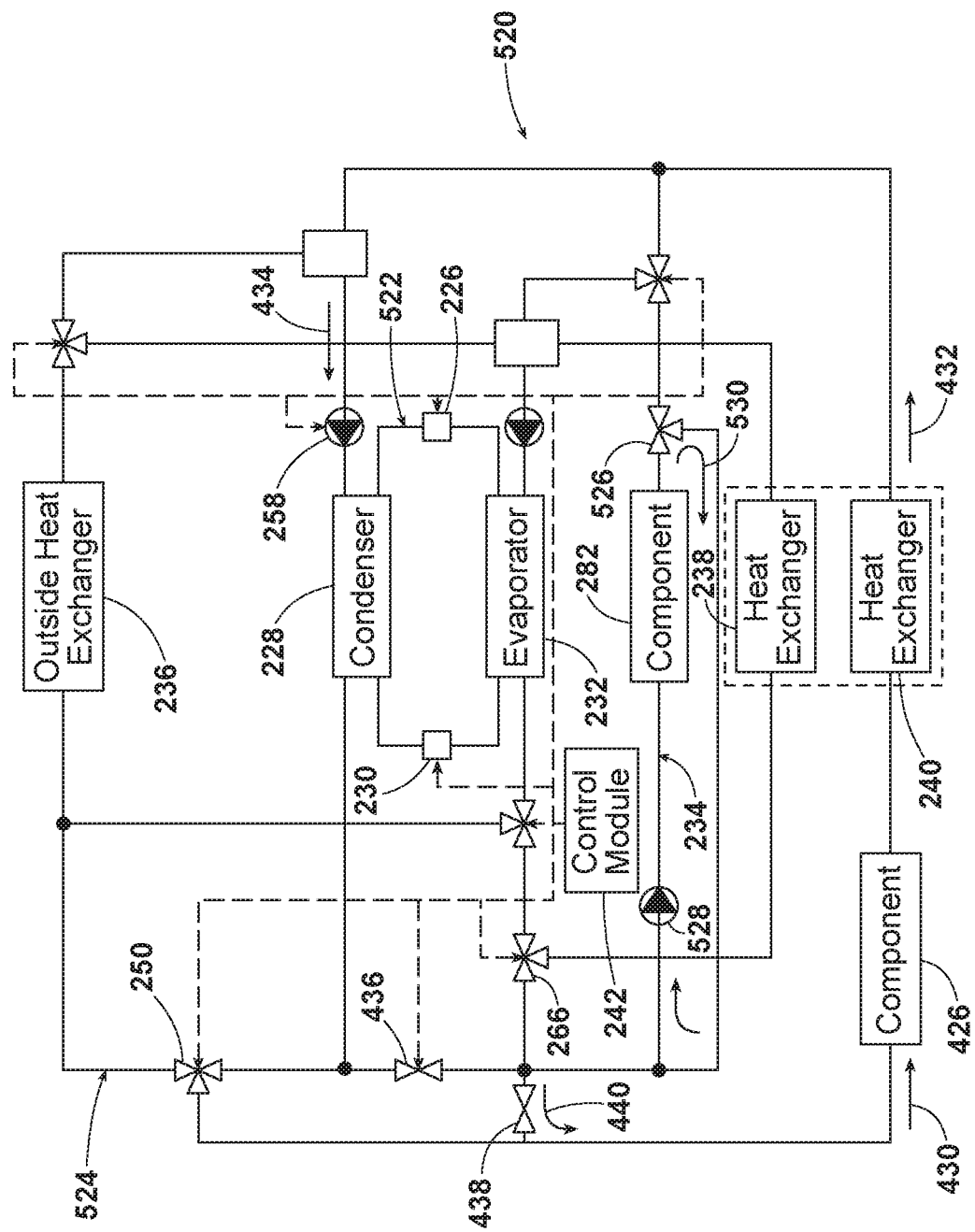
Figure 27:
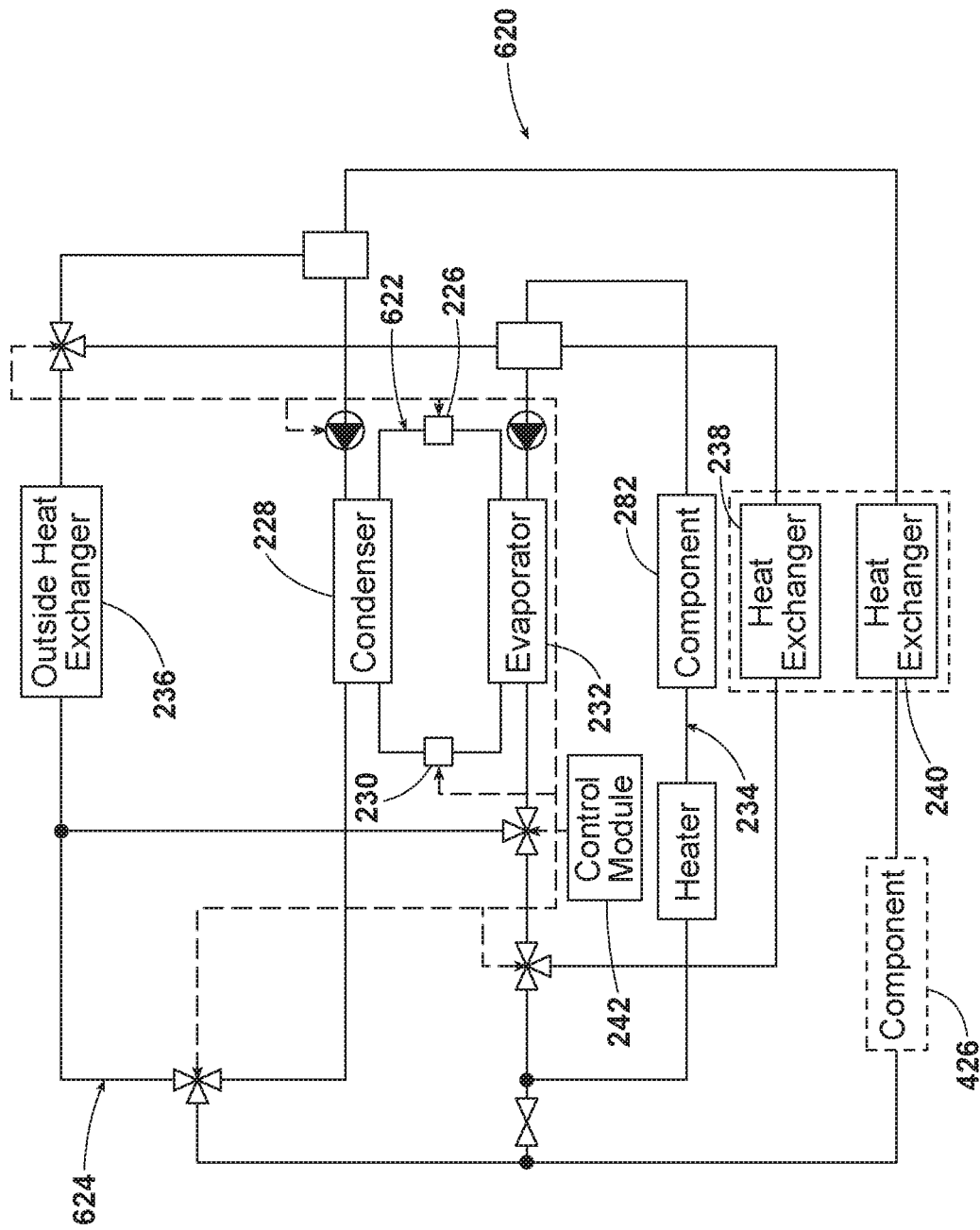

FIG. 26 is a schematic diagram of a fifth alternate embodiment of the vehicle heating and cooling system having a pump within the auxiliary coolant loop for recirculating coolant through the auxiliary coolant loop in a temperature equalization mode of operation; and FIG. 27 is a schematic diagram of a sixth alternate embodiment of the vehicle heating and cooling system having a heater within the auxiliary coolant loop for warming the coolant within the auxiliary coolant loop.

Reference will now be made in detail to the present embodiments of the vehicle heating and cooling system with the thermal management system and related methods of heating and cooling a passenger compartment, examples of which are illustrated in the accompanying drawing figures, wherein like numerals are used to represent like elements.

DETAILED DESCRIPTION

Reference is now made to FIG. 1 which illustrates a schematic diagram of a vehicle heating and cooling system 10 including a primary loop 12 and a secondary loop 14. While the system is operable in any vehicle type, it is considered most suitable for hybrid and electric vehicles. Within the primary loop 12, a fluid (e.g., an R744 or R1234yf refrigerant) in the form of a gas or vapor refrigerant enters a suction port of a compressor 16 and is compressed into a high-pressure, high-temperature gas refrigerant. The high temperature, high pressure gas refrigerant leaves the compressor 16, as shown by action arrow 18, and flows into a first refrigerant-to-coolant heat exchanger 20.

The first refrigerant-to-coolant heat exchanger 20 functions as a condenser. Within the first refrigerant-to-coolant heat exchanger, or condenser, 20, the high-pressure, high-temperature gas refrigerant discharged from the compressor 16 is cooled by giving heat to a coolant within the secondary loop 14. The cooled, high-pressure refrigerant is then sent to an expansion device 22 as shown by action arrow 24. In the expansion device 22, the outlet refrigerant from the condenser 20 is expanded to become a low-pressure, low-temperature liquid and vapor refrigerant mixture which is supplied to a second refrigerant-to-coolant heat exchanger 26 as shown by action arrow 28. The second refrigerant-to-coolant heat exchanger 26 functions as an evaporator.

The expansion device 22 could be an orifice tube with a fixed opening size, a thermal expansion device to yield a specified superheat at the outlet of the evaporator, or an electronic expansion device with adjustable opening size. When the expansion device 22 is an electronic expansion device having an opening therein through which the refrigerant passes, as in the described embodiment, regulation of the flow of refrigerant, or throttling, is used to control a temperature of the refrigerant provided to the second refrigerant-to-coolant heat exchanger 26. Increasing the pressure drop necessarily lowers the temperature of the refrigerant entering the evaporator 26. A control module 30 is electrically connected to the expansion device 22 (as shown by dashed line) and operates to control a flow and a drop in pressure of the refrigerant moving through the expansion device to ensure optimal performance. The control module 30 controls a size of the opening within the expansion device 22 which determines the drop in pressure of the refrigerant moving through the device.

Within the second refrigerant-to-coolant heat exchanger, or evaporator, 26, the low-pressure, low-temperature liquid and vapor refrigerant mixture boils to a vapor due to the heat removed from the coolant within the secondary loop 14. The low-pressure, low-temperature vapor refrigerant exits the evaporator 26, as shown by action arrow 32, and is received at the suction port of the compressor 16. In the compressor 16, the refrigerant is again compressed and cycled through the primary loop 12.

As shown in FIG. 1, the control module 30 is electrically connected to components within the system 10 (as shown by dashed lines) in addition to the expansion device 22. One such component is the compressor 16. In the described embodiment, the compressor 16 is an electric compressor driven by a variable speed motor (not shown) and the control module 30 adjusts a speed of the motor. Other embodiments may utilize fixed or variable displacement compressors driven by a compressor clutch which in turn is driven by an engine of the vehicle.

Other components connected to the control module 30 include first reservoir 68, first manifold 70, second reservoir 74, and second manifold 72. The first and second reservoirs and manifolds each include a plurality of regulating sending and receiving ports. The regulating and sending ports are indicated by the large circles throughout the drawings with active ports shown as filled circles and inactive ports shown as empty circles. In the described embodiment, the control module 30 adjusts an openness of each of the sending and receiving ports of the first and second reservoirs and manifolds dependent upon a mode operation and desired output.

While the described embodiment utilizes a single control module 30 to control the plurality of components within the system 10, any of a plurality of control modules connected to a vehicle computer via a controller area network (CAN) bus in the vehicle, as is known in the art, could be utilized to control one or more of the plurality of components of the system 10. The control module 30 is responsive to a switch (or other input means) operated by an occupant in the vehicle. The switch (e.g., an AC on/off switch) changes a mode of operation from, for example, a cooling mode to an off mode, a heating mode, or other mode of operation.

As shown generally in FIG. 2, configuration of the primary loop may vary in alternate embodiments. FIG. 2A, for example, represents a basic configuration of a primary loop 32. As described above, this primary loop includes a compressor 34, a condenser 36, an expansion device 38, and an evaporator 40. FIG. 2B represents a primary loop 42 configured similar to the basic primary loop 32 of FIG. 2A but includes an internal heat exchanger 44 positioned between the condenser 36 and expansion device 38, and the evaporator 40 and compressor 34. FIG. 2C represents another similar primary loop 46 including a separator 48 in the form of a flash gas bypass positioned between the expansion device 38 and the evaporator 40. A two-way valve 50 is positioned between the evaporator 40 and the separator 48 for controlling an amount of vapor entering the compressor 34. Similarly, FIG. 2D reintroduces the internal heat exchanger 44 of FIG. 2B into primary loop 52 between the condenser 36 and the expansion device 38. Last, a primarily loop 54 is shown in FIG. 2E that is similar to FIG. 2D but includes a second expansion device 56 positioned between the separator 48 and the evaporator 40. The addition of the second expansion device 56 also required replacement of the two-way valve 50 with a three-way valve 58. The three-way valve 58 is connected to a control module and controls an amount of intermediate-pressure, intermediate-temperature vapor entering the suction port of the compressor 34. The operation of each of the noted primary loops is known in the art and reference to a primary loop or a refrigerant loop herein refers to any of the FIG. 2 embodiments or other known refrigerant loops.

As eluded to above, the primary loop 12 interacts with the secondary loop 14 primarily through heat transfers occurring within the first refrigerant-to-coolant heat exchanger 20 and the second refrigerant-to-coolant heat exchanger 26. Within the secondary loop 14, control module 30 controls coolant flows through a plurality of air-to-coolant heat exchangers dependent upon a mode of operation of the system 10. More specifically, the secondary loop 14 includes a plurality of air-to-coolant heat exchangers and an auxiliary coolant loop 60 interconnected to allow the coolant flows to be selectively directed or routed there through. In the described embodiment, the plurality of air-to-coolant heat exchangers includes an outside air-to-coolant heat exchanger 62, and first and second passenger compartment air-to-coolant heat exchangers 64, 66.

As shown in FIG. 1, the secondary loop 14 further includes a first reservoir 68 and a first manifold 70 used to direct a first flow of coolant through at least one of the plurality of air-to-coolant heat exchangers 62, 64, or 66, and a second manifold 72 and a second reservoir 74 for directing a second flow of coolant through at least one other of the plurality of air-to-coolant heat exchangers dependent upon the mode of operation. The control module 30, described above, controls the openness of the sending and receiving ports in the first reservoir 68 and first manifold 70 to direct the first flow of coolant and in the second manifold 72 and second reservoir 74 to direct the second flow of coolant dependent upon the mode of operation and desired output. The utilization of reservoirs and manifolds with modulating functionality eliminates use of certain valves and junctions which results in both cost savings and minimized coolant leakage. The varying directions of the coolant flows are described for the various modes of operation below.

Figure 2A:
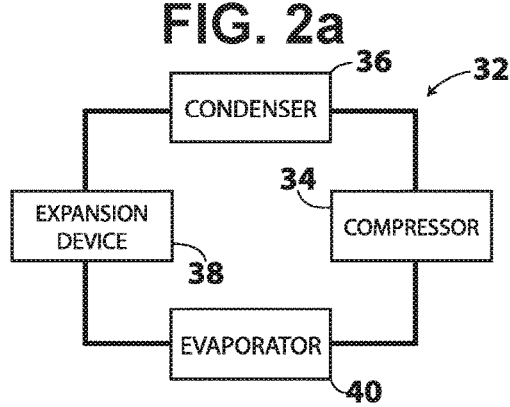
FIGS. 2A-2E depict varying alternate embodiments of the refrigerant loop.
Figure 2B:
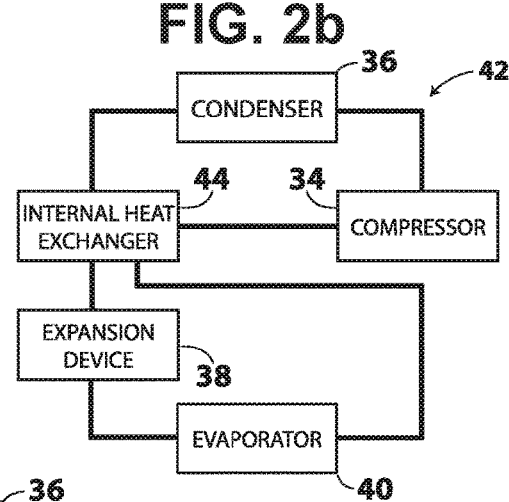
Figure 2C:
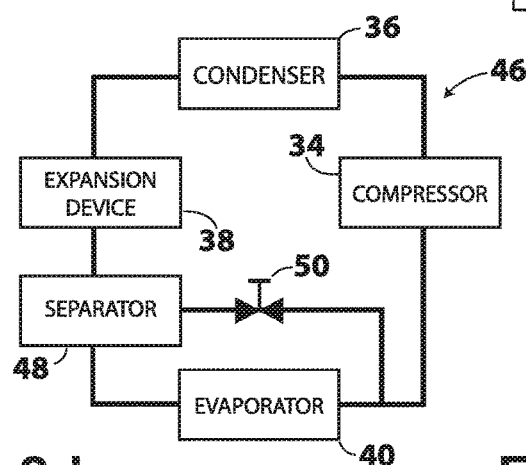
Figure 2D:
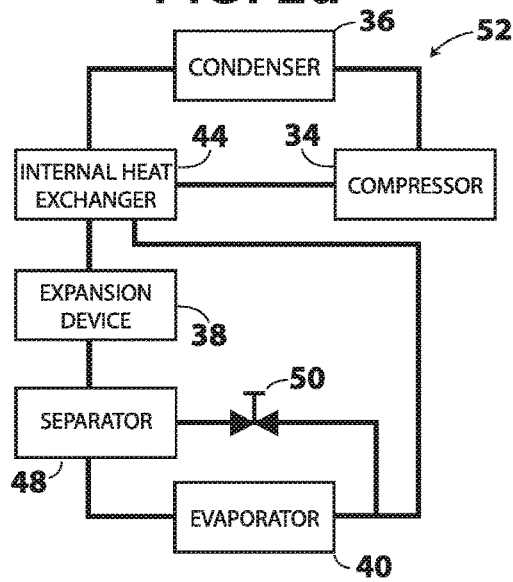
Figure 2E:
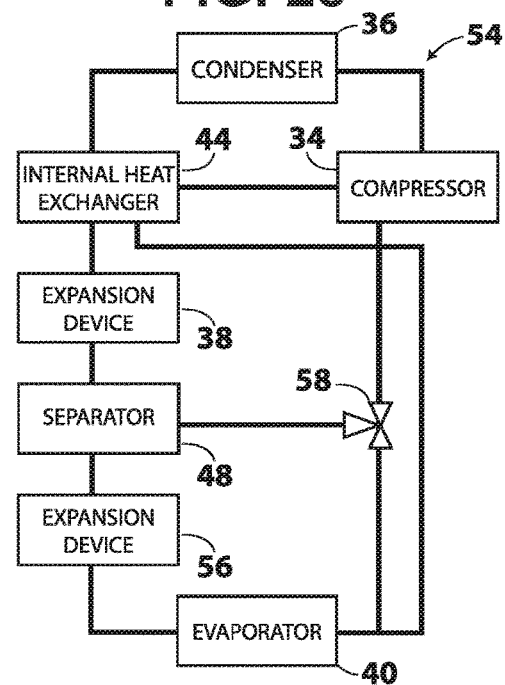
Figure 3:
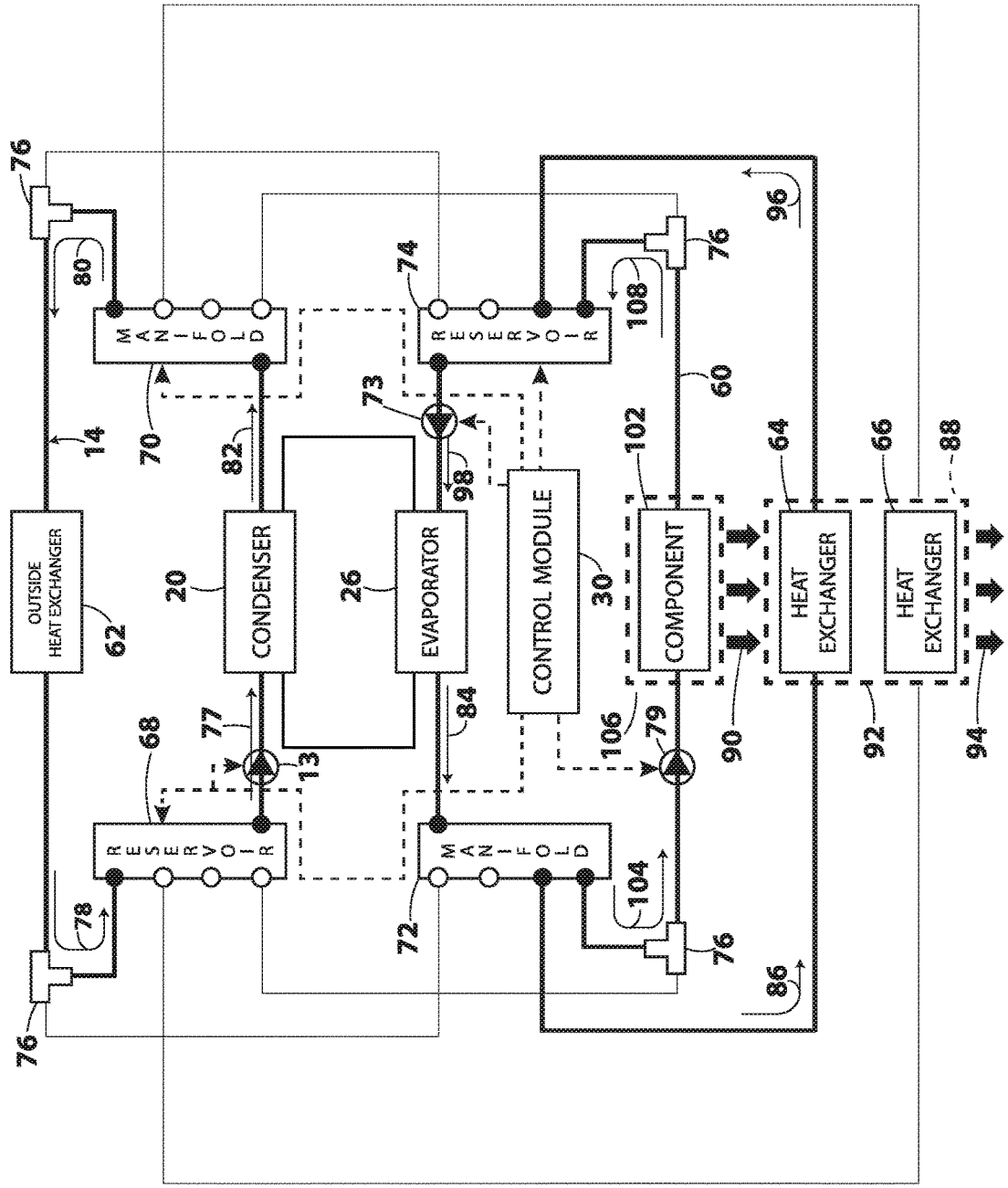
FIG. 3 is a schematic diagram of a vehicle heating and cooling system having modulating manifolds and operating in a cooling mode.

In a cooling mode of operation, as shown in FIG. 3, a first pump 13 in the secondary loop 14 moves warmed coolant (as shown by action arrow 82) from the condenser 20 to the first manifold 70. The first manifold 70 serves as a hot coolant manifold or chamber having one receiving port and four sending ports with modulating functionality. As indicated above, control module 30 is electrically connected to the first manifold 70 opening the receiving port and one sending port (shown by filled circles) to direct the warmed coolant through intervening T-junction 76 to the first air-to-coolant heat exchanger 62 as shown by action arrow 80.

The first air-to-coolant heat exchanger 62 is an outside heat exchanger (e.g. a low temperature radiator) positioned along a front of the vehicle as is known in the art. Within the outside air-to-coolant heat exchanger 62, warmed coolant discharged from the condenser 20 is cooled due primarily to the effect of outside air. A fan, active grille shutters, or the like may be utilized to create and regulate a flow of air over the outside air-to-coolant heat exchanger 62.

As indicated above, control module 30 is electrically connected to the first reservoir 68 and operates to open one receiving port and a sending port (shown by filled circles) to receive the cooled coolant from the outside heat exchanger 62, as shown by action arrow 78, and to direct the coolant back to the condenser 20, as shown by action arrow 77, via pump 13. The first reservoir 68 is an accumulator which serves as a hot coolant reservoir containing four receiving ports and one sending port with modulating functionality. In alternative embodiments, the manifolds and reservoirs described herein may include more or fewer receiving and/or sending ports.

Also within the secondary loop 14, cold coolant is directed from the evaporator 26 to a second manifold 72 as shown by action arrow 84. The second manifold 72 serves as a cold coolant manifold or chamber also having one receiving port and four sending ports with modulating functionality. As indicated above, control module 30 is electrically connected to the second manifold 72 opening the receiving port and one sending port to direct the cooled coolant to the second air-to-coolant heat exchanger 64 as shown by action arrow 86.

In the described cooling mode, the second air-to-coolant heat exchanger, or first passenger compartment heat exchanger, 64 functions as a cooler. As is known in the art, the second air-to-coolant heat exchanger 64 is positioned within a heating, ventilation, and air conditioning (HVAC) case 88 of the vehicle and is used to cool a passenger compartment (not shown). Warm, moist air flowing across the second air-to-coolant heat exchanger 64 (as shown by arrows 90) transfers its heat to the cold coolant within the second air-to-coolant heat exchanger. The byproducts are a lowered temperature air entering the passenger compartment and condensation from the air which is routed from the second air-to-coolant heat exchanger 64 to an exterior of the vehicle. A blower (not shown) blows the air across the second air-to-coolant heat exchanger 64 and through a vent 92 into the passenger compartment as shown by arrows 94. This process results in the passenger compartment having a cooler, drier air therein.

Within the second air-to-coolant heat exchanger 64, the cold coolant is warmed due to the heat removed from the air and directed to a second reservoir 74 (as shown by action arrow 96). The second reservoir 74 is an accumulator which serves as a cold coolant reservoir having receiving and sending ports with modulating functionality. Control module 30 is further electrically connected to a second pump 73 and second reservoir 74 and operates to open one receiving port and the sending port to receive the cooled coolant from the second air-to-coolant heat exchanger 64, as shown by action arrow 96, and to direct the coolant back to the evaporator 26, as shown by action arrow 98. In the evaporator 26, the warmed coolant is again cooled by giving its heat to the refrigerant in the primary loop 12, and cycled through the secondary loop 14.

In the described embodiment, the secondary loop 14 further includes an auxiliary coolant loop 60 for thermally managing, or regulating, a temperature of at least one component 102 (e.g., a battery, electronics, or brakes, etc.). While the auxiliary coolant loop 60 provides the ability to cool or warm the component 102, as will be described further below, the component is only cooled in the described cooling mode of operation as an illustration. This presupposes that the system 10 operates in the cooling mode due to high ambient temperatures that are sufficient to warrant the need for cooling of the component 102.

Within the secondary loop 14, as shown in FIG. 3, cold coolant is directed from a second port of the second manifold 72 through an intervening T-junction 76 into the auxiliary coolant loop 60 as shown by action arrow 104. Again, operation of the second manifold 72 is controlled by control module 30 which is electrically connected to the second manifold and a third pump 79. In this mode of operation, the control module 30 opens one of the sending ports to direct the cooled coolant through the intervening T-junction to a compartment 106 housing the component 102 as shown by action arrow 104. It should be noted that the third pump 79 may be turned off in this mode of operation and that the compartment 106 may not be utilized in all embodiments.

Within the compartment 106, the cold coolant flows past the component 102 drawing heat away from the component and warming the coolant. The warmed coolant is then directed by an intervening T-junction 76 to the second reservoir 74 as shown by action arrow 108. Within the second reservoir 74, the warmed coolant is combined with the warmed coolant from the first passenger compartment air-to-coolant heat exchanger 64. As indicated above, control module 30 is electrically connected to the second reservoir 74 opening one receiving port to receive the warmed coolant from the second air-to-coolant heat exchanger 64, as shown by action arrow 96, and to direct the coolant back to the evaporator 26 via pump 73, as shown by action arrow 98. In the evaporator 26, the combined warmed coolant is again cooled by giving its heat to the refrigerant in the primary loop 12, and cycled through the secondary loop 14.

Figure 4:
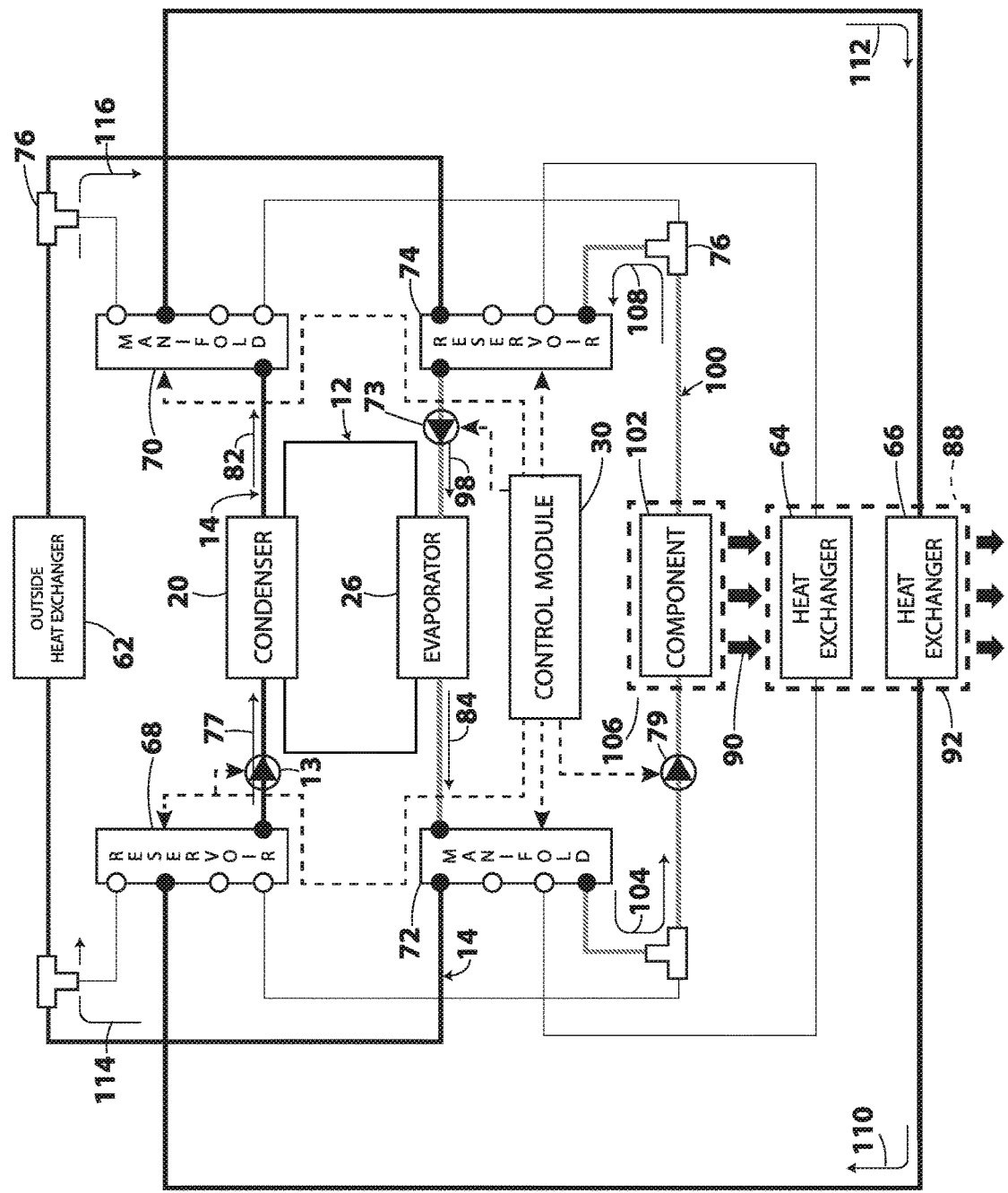
FIG. 4 is a schematic diagram of a vehicle heating and cooling system having modulating manifolds and operating in a heating mode while providing component cooling.

In a heating mode of operation, as shown in FIG. 4, the secondary loop 14 directs cold coolant from the evaporator 26 to the second manifold 72 as shown by action arrow 84. The second manifold 72 is connected to the outside air-to-coolant heat exchanger 62. The control module 30 is electrically connected to the second manifold 72 opening one sending port and the receiving port to direct the cooled coolant thru an intervening T-junction 76 to the outside air-to-coolant heat exchanger 62 as shown by action arrow 114. In the outside air-to-coolant heat exchanger 62, the cooled coolant discharged from the evaporator 26 is warmed due primarily to the effect of outside air. As shown by action arrow 116, the warmed coolant is directed by an intervening T-junction 76 to the second reservoir 74. As indicated above, control module 30 is electrically connected to the second reservoir 74 opening one receiving port and the sending port to direct the warmed coolant back to the evaporator 26 via pump 73 as shown by action arrow 98.

The secondary loop 14 also directs warmed coolant (as shown by action arrow 82) from the condenser 20 to the first manifold 70. The first manifold 70 is connected to a third air-to-coolant heat exchanger 66. The control module 30 is electrically connected to the first manifold 70 to open one of the sending ports and direct the warmed coolant to the third air-to-coolant heat exchanger 66, as shown by action arrow 112. The signal could be in response to the switch or other input means operated by the occupant in the vehicle to change the mode of operation.

In the described heating mode, the third air-to-coolant heat exchanger, or second passenger compartment heat exchanger, 66 functions as a heater core. As is known in the art, the third air-to-coolant heat exchanger 66 is positioned within the HVAC case 88 of the vehicle and is used to warm the passenger compartment. Cold air flowing across the third air-to-coolant heat exchanger 66 (as shown by arrows 90) absorbs heat from the warm coolant thereby increasing the temperature of the air. A blower (not shown) blows air across the third air-to-coolant heat exchanger 66 and through the vent 92 into the passenger compartment. This process results in the passenger compartment having a warmer air therein.

Within the third air-to-coolant heat exchanger 66, the warm coolant is cooled due to the heat given to the air and directed to the first reservoir 68 (as shown by action arrow 110). Again, control module 30 is electrically connected to the first pump 13 and the first reservoir 68 opening one of the receiving ports and signaling the first reservoir to direct the cooled coolant to the condenser 20 as shown by action arrow 77. In the condenser 20, the cooled coolant is again warmed by absorbing its heat from the refrigerant in the primary loop 12, and cycled through the secondary loop 14.

As described above, the secondary loop 14 includes an auxiliary coolant loop for regulating a temperature of at least one component 102 (e.g., a battery, electronics, or brakes, etc.). In the heating mode, the auxiliary coolant loop 100 may be used to heat or cool the component 102. FIG. 4 shows the secondary loop 14 utilized to cool the component 102 in the heating mode.

In this instance, cold coolant is directed by a T-junction 76 from the second manifold 72 into the auxiliary coolant loop 100 as shown by action arrow 104. As described above, the second pump 73 is electrically connected to the control module 30 which drives the cold coolant from the second manifold 72 through the compartment 106 housing the component 102. The third pump 79 may be turned off in this mode of operation.

The cold coolant flows past the component 102 drawing heat away from the component and warming the coolant. The warmed coolant is then directed by another T-junction 76 to the second reservoir 74, as shown by action arrow 108, where the warmed coolant is combined with the warmed coolant from the outside air-to-coolant heat exchanger 62. As indicated above, control module 30 is electrically connected to the second reservoir 74 opening one of the receiving ports for receiving the directed warmed coolant from the compartment 106 to the second reservoir 74. The second reservoir 74 further directs the warmed coolant, combined with the warmed coolant from the outside air-to-coolant heat exchanger 62, to the evaporator 26, as shown by action arrow 98. In the evaporator 26, the combined warmed coolant is again cooled by giving its heat to the refrigerant in the primary loop 12, and cycled through the secondary loop 14.

Figure 5:
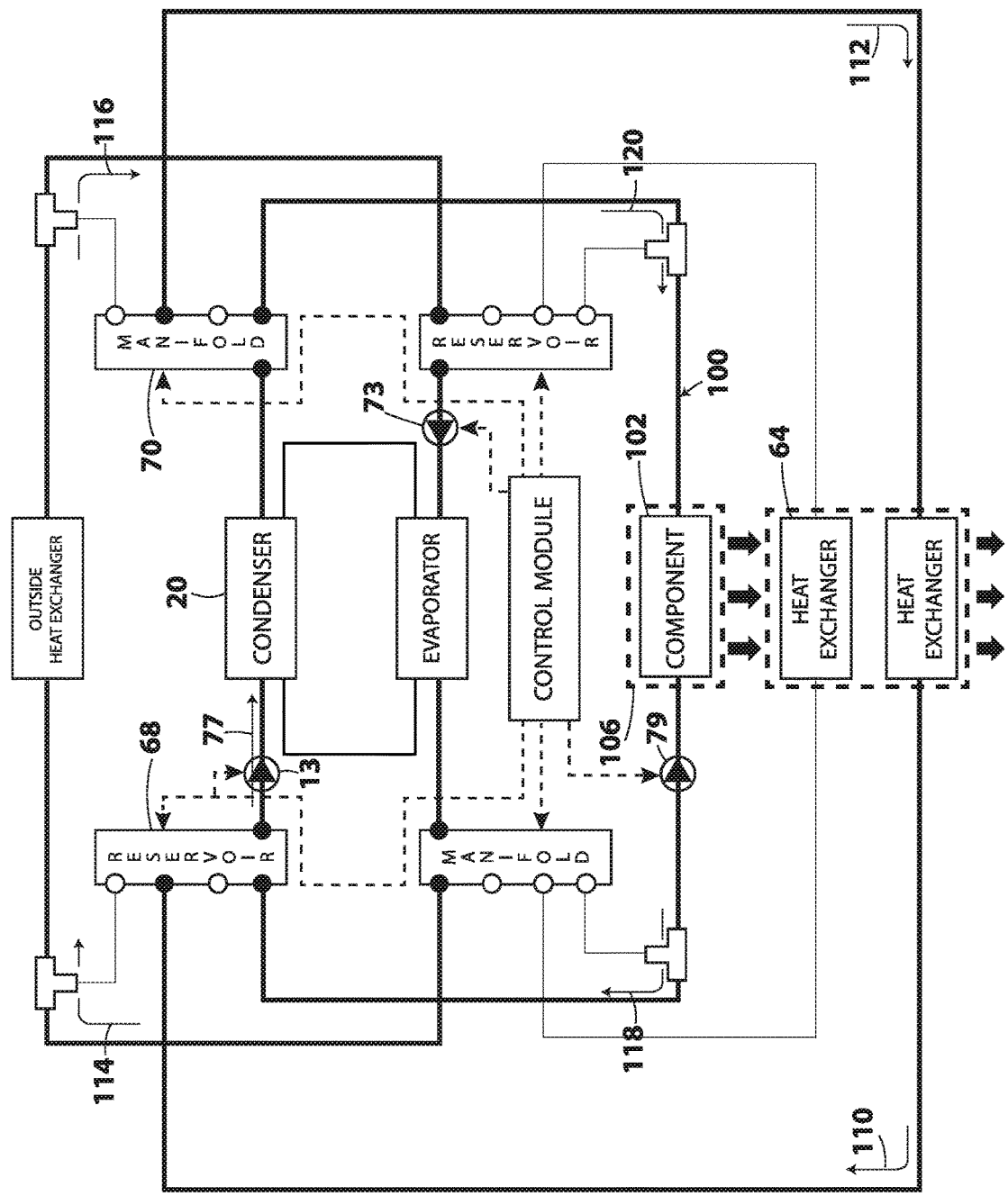
FIG. 5 is a schematic diagram of a vehicle heating and cooling system having modulating manifolds and operating in a heating mode while providing component warming.

As shown in FIG. 5, the secondary loop 14 may also be utilized to warm a component 102 in the heating mode. In this instance, warm coolant is directed through a T-junction 76 from the first manifold 70 into the auxiliary coolant loop 100 as shown by action arrow 120. The first pump 13 is electrically connected to the control module 30 which drives the hot coolant from the first manifold 70 through the compartment 106 housing the component 102. The third pump 79 is turned off in this mode of operation but utilized in others as described below.

The warm coolant flows past the component 102 providing heat to the component and cooling the coolant. The cooled coolant is then directed by the T-junction 76 to the first reservoir 68 as shown by action arrow 118. Within the first reservoir 68, the cooled coolant is combined with cooled coolant from the third air-to-coolant heat exchanger 66. As indicated above, control module 30 is electrically connected to the first reservoir 68 opening one of the receiving ports and a sending port to direct the cooled coolant to the condenser 20 as shown by action arrow 77. In the condenser 20, the combined cooled coolant is again warmed by absorbing heat from the refrigerant in the primary loop 12, and cycled through the secondary loop 14.

Figure 6:
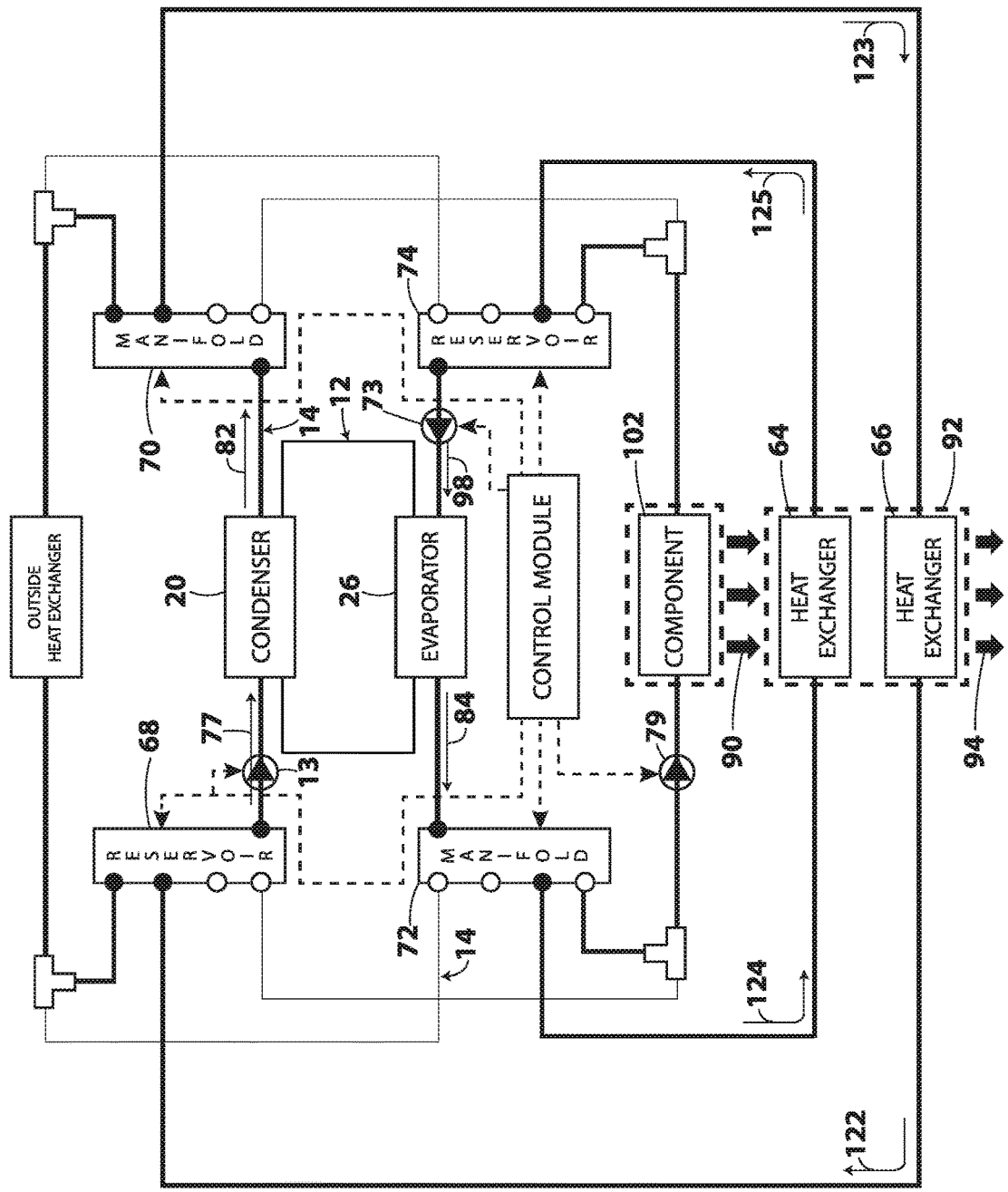
FIG. 6 is a schematic diagram of a vehicle heating and cooling system having modulating manifolds and operating in a dehumidification mode while providing component cooling.

In a dehumidification mode of operation, as shown in FIG. 6, cold coolant is pumped through the evaporator 26 to the second manifold 72, as shown by action arrow 84, and warm coolant is concurrently pumped through the condenser 20 to the first manifold 72 as shown by action arrow 82. The second manifold 72 is connected to the second air-to-coolant heat exchanger 64. The control module 30 is electrically connected to the second manifold 72 opening one of the sending ports to direct the cooled coolant to the second air-to-coolant heat exchanger 64 as shown by action arrow 124.

In the described dehumidification mode, the second air-to-coolant heat exchanger 64 functions as a cooler, as described above in the cooling mode of operation, and is used to cool and dehumidify the moist, warm air. Within the second air-to-coolant heat exchanger 64, the cold coolant is warmed due to the heat removed from the air and directed to the second reservoir 74 (as shown by action arrow 125). Control module 30 is electrically connected to the second reservoir 74 opening one of the receiving ports. Pump 73 draws the warmed coolant from the second reservoir 74 pumping it into the evaporator 26 as shown by action arrow 98. In the evaporator 26, the warmed coolant is again cooled by giving its heat to the refrigerant in the primary loop 12, and cycled through the secondary loop 14.

While the second air-to-coolant heat exchanger 64 functions to lower the humidity of the air within the passenger compartment for the comfort of the passengers or to defog one or more of the windows/windshield within the passenger compartment, the air in the passenger compartment is also cooled through this process. In this scenario, it may be desired to re-heat or warm the air in the passenger compartment to ensure the comfort of the passengers. Accordingly, in the dehumidification mode of operation, warmed coolant from the first manifold 70 is concurrently connected to the third air-to-coolant heat exchanger 66. The control module 30 is electrically connected to the first manifold 70 which directs the warmed coolant to the third air-to-coolant heat exchanger 66 as shown by action arrow 123.

In the described dehumidification mode, the third air-to-coolant heat exchanger 66 functions as a heater core to heat the cooled, dehumidified air and supply warm air to the passenger compartment. Within the third air-to-coolant heat exchanger 66, the warm coolant is cooled due to the heat removed to the air and directed to the first reservoir 68 (as shown by action arrow 122). Again, control module 30 is electrically connected to the first reservoir 68 opening one of the receiving ports. Pump 13 draws the cooled coolant from the first reservoir 68 and pumps it into the condenser 20 as shown by action arrow 77. In the condenser 20, the cooled coolant is again warmed by absorbing heat from the refrigerant in the primary loop 12, and cycled through the secondary loop 14.

In the dehumidification mode of operation, the auxiliary coolant loop may operate to either cool or warm the component 102 in the manner described above for the heating mode of operation.

Figure 7:
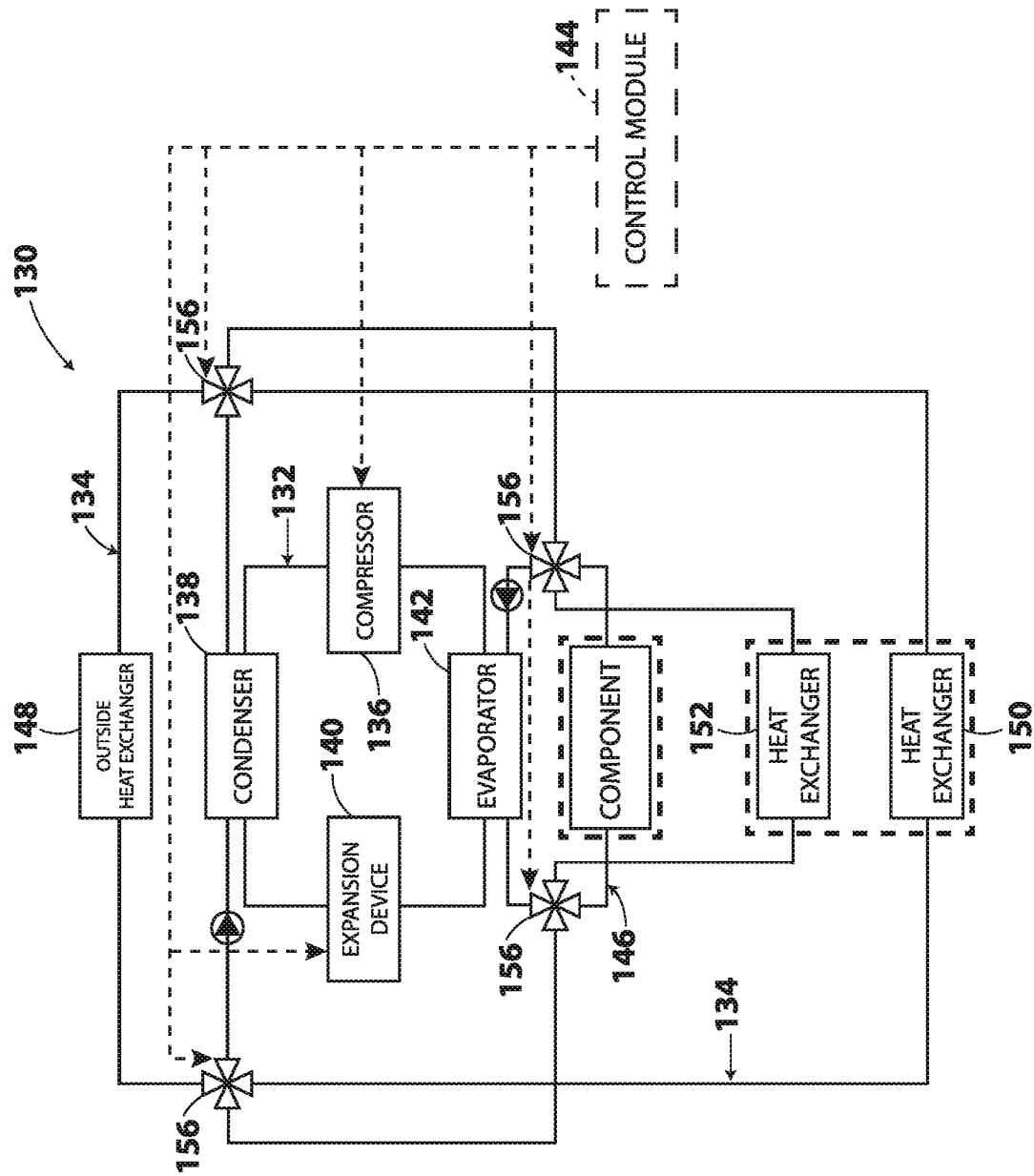
FIG. 7 is a schematic diagram of an alternate embodiment of the vehicle heating and cooling system having a plurality of regulating valves.

FIG. 7 illustrates a schematic diagram of an alternate embodiment of a vehicle heating and cooling system 130 including a primary loop 132 and a secondary loop 134. The primary loop 132 includes at least a compressor, 136, a first refrigerant-to-coolant heat exchanger, or condenser 138, an expansion device 140, and a second refrigerant-to-coolant heat exchanger, or evaporator, 142. As described above, the primary loop 132 interacts with the secondary loop 134 primarily through heat transfers occurring within the condenser 138 and the evaporator 142. The functionality of the primary loop 132 and its components is described above with regard to the first described embodiment. In addition, the primary loop 132 may also encompass any of the embodiments described in FIG. 2.

As shown, the secondary loop 134 is connected to allow coolant flows to be directed or routed through a plurality of air-to-coolant heat exchangers dependent upon a mode of operation. More specifically, the secondary loop 134 includes a plurality of air-to-coolant heat exchangers, pumps, and an auxiliary coolant loop 146 interconnected to allow the coolant flows to be selectively directed therethrough. The plurality of air-to-coolant heat exchangers includes an outside heat exchanger 148, and first and second passenger compartment heat exchangers 152, 150, and the control module 144 controls the direction of the coolant flows dependent upon the mode of operation of the system 130.

In the described alternate embodiment, the secondary loop 134 further includes a plurality of four-way valves to control a first flow of coolant through at least one of the plurality of air-to-coolant heat exchangers 148, 150, 152, and a second flow of coolant through at least one other of the plurality of air-to-coolant heat exchangers dependent upon the mode of operation. The control module 144, as generally described above, controls each of the plurality of four-way valves (each designated reference numeral 156) to direct the first and second flows of coolant dependent upon the mode of operation.

Each of the plurality of valves is a four-way valve that may be replaced in alternate embodiments by a series of one-way, two-way, and/or three-way valves sufficient to direct the coolant flows in desired directions dependent upon the mode of operation. Again, the valves in the series of valves receive signals from and are controlled by the control module 144. The varying directions the valves direct the coolant flows are described in more detail for the various modes of operation below.

Figure 8:
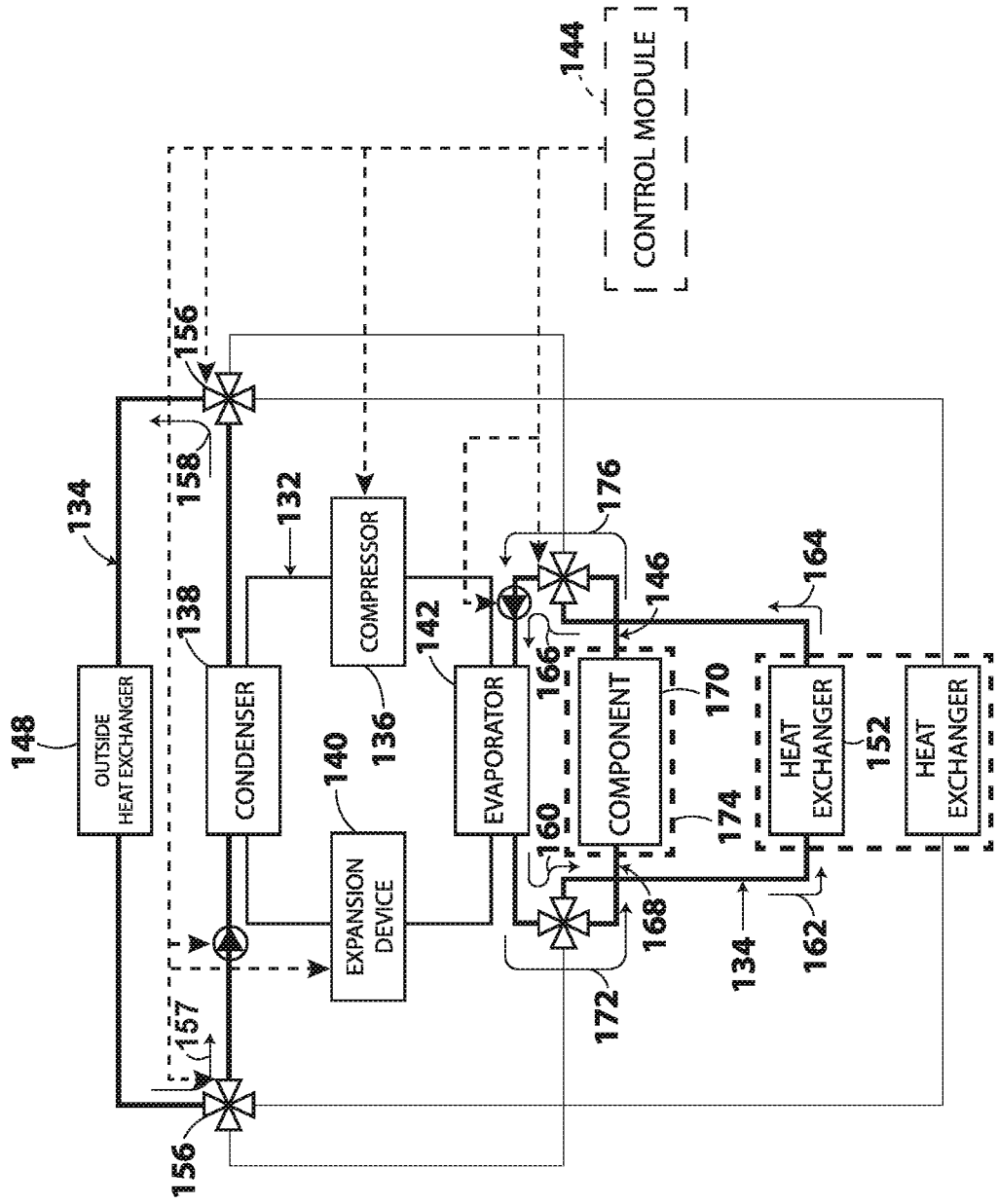
FIG. 8 is a schematic diagram of the alternate embodiment of the vehicle heating and cooling system having a plurality of regulating valves operating in a cooling mode.

In a cooling mode of operation, as shown in FIG. 8, the secondary loop 134 directs warmed coolant (as shown by action arrow 158) from the condenser 138 to the outside heat exchanger 148 via a first four-way valve 156. As indicated above, control module 144 is electrically connected to the intervening four-way valve 156 and signals the four-way valve to direct the warmed coolant to the outside heat exchanger 148. The outside heat exchanger 148 functions as described above in the first embodiment to cool the coolant. Again, cooled coolant is directed by a second four-way valve 156 through pump 149 back to the condenser 138, as shown by action arrow 157, in response to a signal from the control module 144.

Also, within the secondary loop 134, cold coolant is directed from the evaporator 142 to a second air-to-coolant heat exchanger 152 via a third four-way valve 156. As indicated above, control module 144 is electrically connected to the intervening four-way valve 156 and pump 165 and signals the four-way valve to direct the cooled coolant to the second air-to-coolant heat exchanger 152 as shown by action arrows 160 and 162.

In the described cooling mode, the second air-to-coolant heat exchanger 152 functions as a cooler in the manner described above for the second air-to-coolant heat exchanger 64. Within the second air-to-coolant heat exchanger 152, the cold coolant is warmed due to the heat removed from the air and directed through a fourth four-way valve 156 back to the evaporator 142 through pump 165. As indicated above, control module 144 is electrically connected to the intervening four-way valve 156 and signals the four-way valve to direct the warmed coolant to the evaporator 142 as shown by action arrows 164 and 166. In the evaporator 142, the warmed coolant is again cooled by giving its heat to the refrigerant in the primary loop 132, and cycled through the secondary loop 134.

The alternate secondary loop 134 further includes an auxiliary coolant loop 146 for regulating a temperature of at least one component 170 (e.g., a battery, electronics, or brakes, etc.). While the auxiliary coolant loop 146 provides the ability to cool or warm the component 170, as will be described further below, the component is only cooled in the described cooling mode of operation. Again, this presupposes that the system 130 operates in the cooling mode due to high ambient temperatures that are sufficient to warrant the need for cooling of the component.

Within the secondary loop 134, cold coolant is directed from the evaporator 142 into the auxiliary coolant loop 146, as shown by action arrow 172, via the third four-way valve 156. Again, control module 144 is electrically connected to the intervening four-way valve 156 and signals the four-way valve to direct the cooled coolant through a compartment 174 housing the component 170. The cold coolant flows past the component 170 drawing heat away from the component and warming the coolant. The warmed coolant is then directed by the fourth four-way valve 156 through pump 165 to the evaporator 142 as shown by action arrow 176.

As shown, the warmed coolant is combined with the warmed coolant from the second air-to-coolant heat exchanger 152. As indicated above, control module 144 is electrically connected to the intervening third and fourth four-way valves 156 and signals the four-way valves to direct the warmed coolant to evaporator 142. In the evaporator 142, the combined warmed coolant is again cooled by giving its heat to the refrigerant in the primary loop 132, and cycled through the secondary loop 134.

Figure 9:
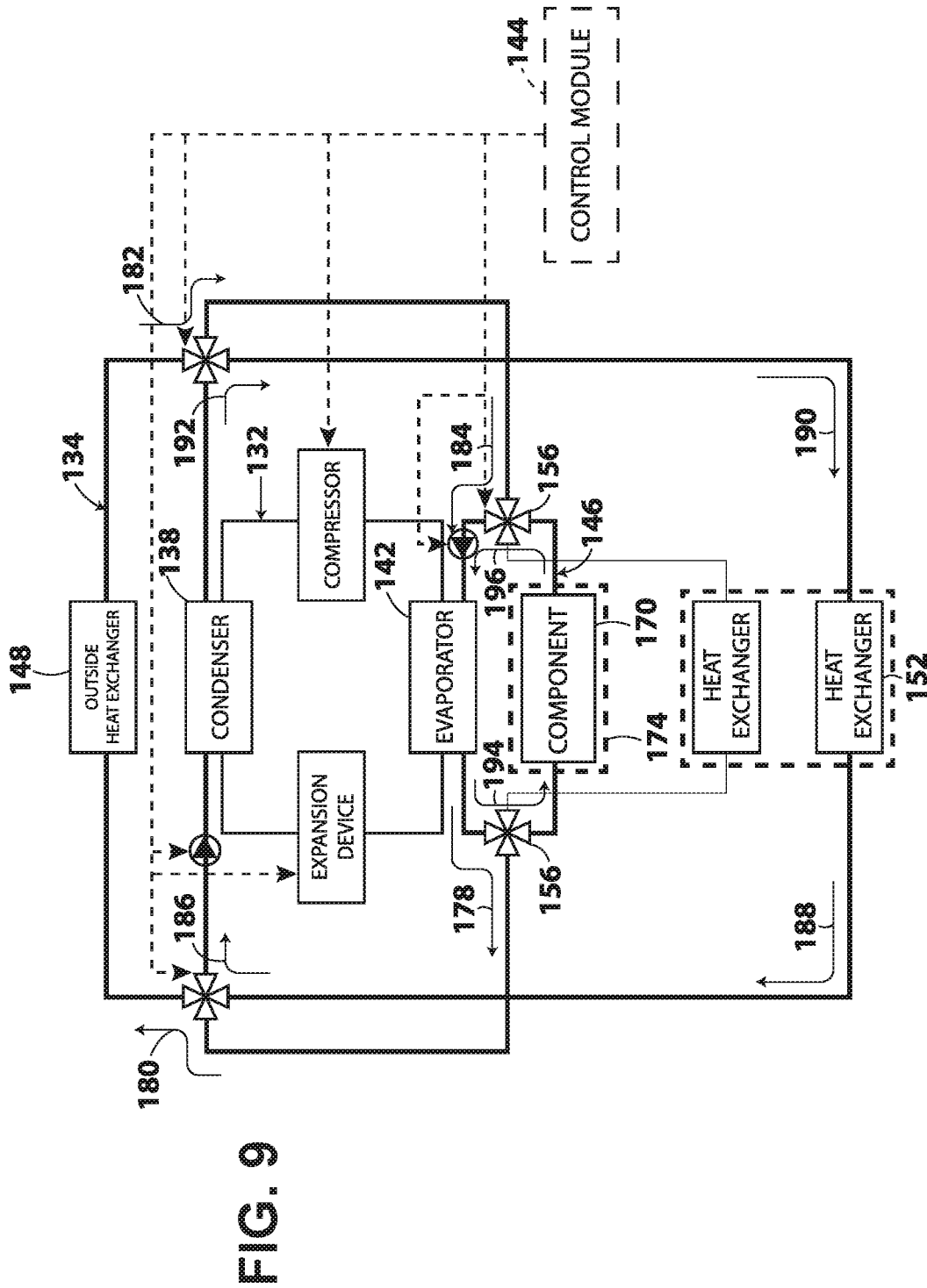
FIG. 9 is a schematic diagram of the alternate embodiment of the vehicle heating and cooling system having a plurality of regulating valves operating in a heating mode.

In a heating mode of operation, as shown in FIG. 9, the secondary loop 134 directs cold coolant from the evaporator 142 to the outside heat exchanger 148 via the third and second four-way valves 156. The control module 144 signals the intervening four-way valves 156 to direct the cooled coolant to the outside heat exchanger 148 as shown by action arrows 178 and 180. In the outside heat exchanger 148, the cooled coolant discharged from the evaporator 138 is warmed due primarily to the effect of outside air. The warmed coolant is drawn by pump 165 and directed by the first and fourth four-way valves 156 back to the evaporator 142 as shown by action arrows 182 and 184. As indicated above, control module 144 is electrically connected to the first and fourth four-way valves 156 and pump 165 and signals the four-way valves accordingly.

Also within the secondary loop 134, warmed coolant is pumped through the condenser 138 and directed to the third air-to-coolant heat exchanger 150 via the first four-way valve 156 as shown by action arrows 192 and 190. The control module 144 signals the first four-way valve 156 to direct the warmed coolant to the third air-to-coolant heat exchanger 150.

In the described heating mode, the third air-to-coolant heat exchanger 150 functions as a heater core in the manner described above for third air-to-coolant heat exchanger 66. Within the third air-to-coolant heat exchanger 150, the warm coolant is cooled due to the heat given to the air and directed through the second four-way valve 156 back to the condenser 138 through pump 149 as shown by action arrows 188 and 186. Again, control module 144 is electrically connected to the intervening pump 149 and four-way valve 156 and signals the four-way valve to direct the cooled coolant to the condenser 138. In the condenser 138, the cooled coolant is again warmed by absorbing heat from the refrigerant in the primary loop 132, and cycled through the secondary loop 134.

As described above, the alternate secondary loop 134 includes an auxiliary coolant loop 146 for regulating a temperature of at least one component 170. In the heating mode, the auxiliary coolant loop 146 may be used to cool the component 170 as shown in FIG. 9. In this instance, cold coolant is directed from the evaporator 142 into the auxiliary coolant loop 146, as shown by action arrow 194, via the third four-way valve 156. Again, control module 144 is electrically connected to the intervening four-way valve 156 and signals the four-way valve to direct the cold coolant through the compartment 174. The cold coolant flows past the component 170 drawing heat away from the component and warming the coolant. The warmed coolant is then directed by the fourth four-way valve 156 back to the evaporator 142 as shown by action arrow 196.

As shown, the warmed coolant is combined with the warmed coolant from the first air-to-coolant heat exchanger 148 as it passes through the fourth four-way valve 156. As indicated above, control module 144 is electrically connected to the intervening fourth four-way valve and signals the four-way valve to direct the warmed coolant from the compartment 174 to the fourth four-way valve which further directs the warmed coolant, combined with the warmed coolant from the outside heat exchanger 148, through pump 165 to the evaporator 142. In the evaporator 142, the combined warmed coolant is again cooled by giving its heat to the refrigerant in the primary loop 132, and cycled through the secondary loop 134.

Figure 10:
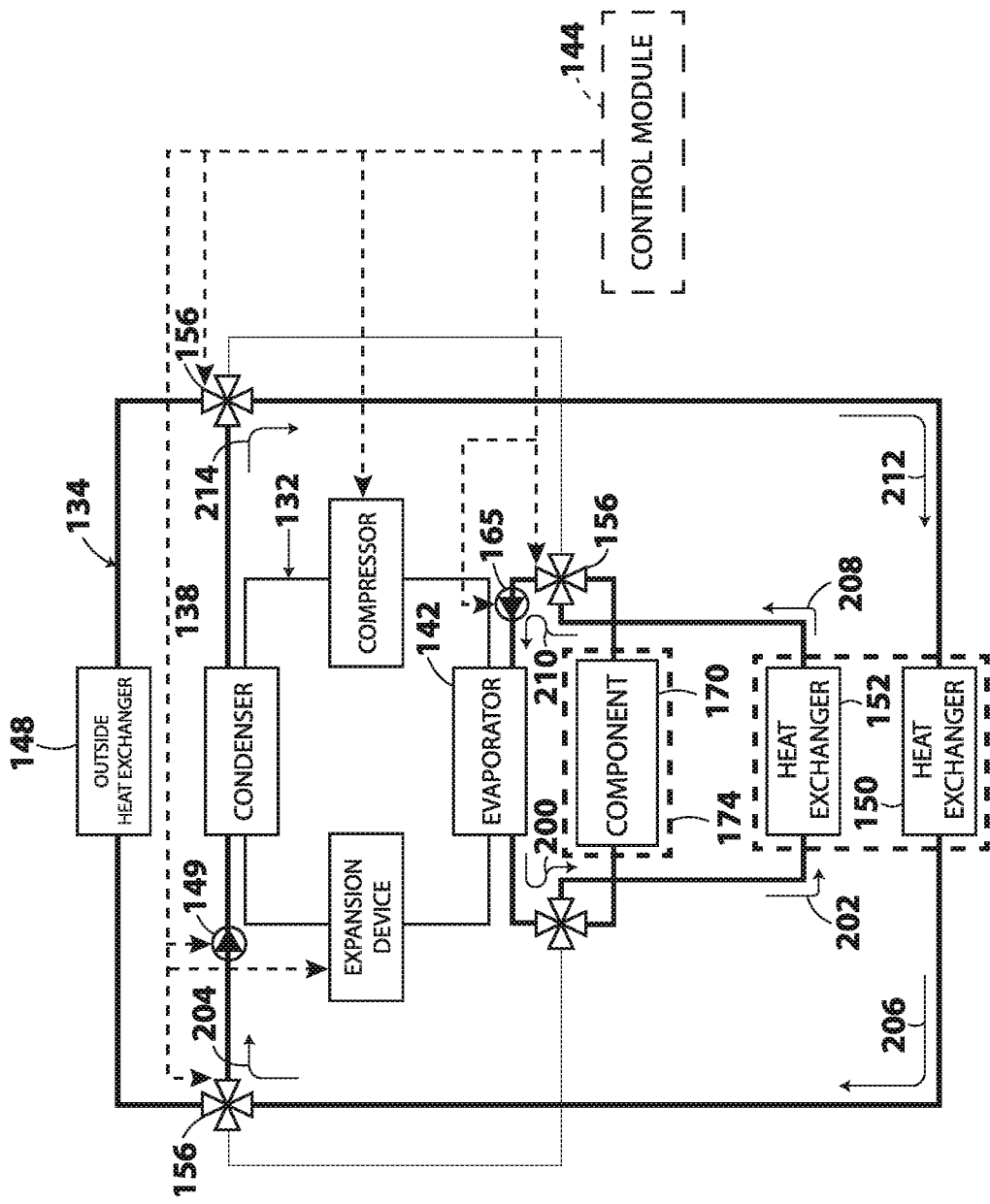
FIG. 10 is a schematic diagram of the alternate embodiment of the vehicle heating and cooling system having a plurality of regulating valves operating in a dehumidification and reheating mode.

In a dehumidification mode of operation, shown in FIG. 10, cold coolant is directed from the evaporator 142 to the second air-to-coolant heat exchanger 152 as shown by action arrows 200 and 202 and warm coolant is concurrently directed from the condenser 138 to the third air-to-coolant heat exchanger 150 as shown by action arrows 214 and 212.

More specifically, the second air-to-coolant heat exchanger 152 functions as a cooler in the manner described above for second air-to-coolant heat exchanger 64, and is used to cool and dehumidify the moist, warm air. Within the second air-to-coolant heat exchanger 152, the cold coolant is warmed due to the heat removed from the air and directed through fourth four-way valve 156 and pump 165 back to the evaporator 142. As indicated above, control module 144 is electrically connected to the pump 165 and intervening four-way valve 156 and signals the four-way valve to direct the warmed coolant to the evaporator 142 as shown by action arrows 208 and 210. In the evaporator 142, the warmed coolant is again cooled by giving its heat to the refrigerant in the primary loop 132, and cycled through the secondary loop 134.

The third air-to-coolant heat exchanger 150 functions as a heater core to heat the cooled, dehumidified air and supply warm air to the passenger compartment. Within the third air-to-coolant heat exchanger 150, the warm coolant is cooled due to the heat removed to the air and directed through the second four-way valve 156 and pump 149 to the condenser 138 as shown by action arrows 206 and 204. Again, control module 144 is electrically connected to the pump 149 and intervening four-way valve 156 and signals the four-way valve to direct the cooled coolant to the condenser 138. In the condenser 138, the cooled coolant is again warmed by absorbing heat from the refrigerant in the primary loop 132, and cycled through the secondary loop 134.

In the dehumidification mode of operation, the auxiliary coolant loop 146 may operate to cool or warm the component 170 in the manner described above.

In accordance with the method of heating and cooling a passenger compartment in a vehicle, a refrigerant is cycled through a refrigerant loop 12, a first coolant flow is routed through at least one of a plurality of air-to-coolant heat exchangers 62, 64, 66, and a second coolant flow is routed through at least one other of the plurality of air-to-coolant heat exchangers. A control module 30 is electrically connected to each of the plurality of air-to-coolant heat exchangers 62, 64, and 66 and controls the routing of the first and second coolant flows dependent upon a mode of operation of the vehicle.

In another possible method, the first flow of coolant may be routed through a first manifold 70, an auxiliary coolant loop 60, and a first reservoir 68 for heating a component 102 and/or the second flow of coolant may be routed through a second manifold 72, the auxiliary coolant loop, and a second reservoir 74 for cooling the component dependent upon the mode of operation. Of course, other methods of heating and cooling a passenger compartment in a vehicle may be utilized as described above.

Figure 11:
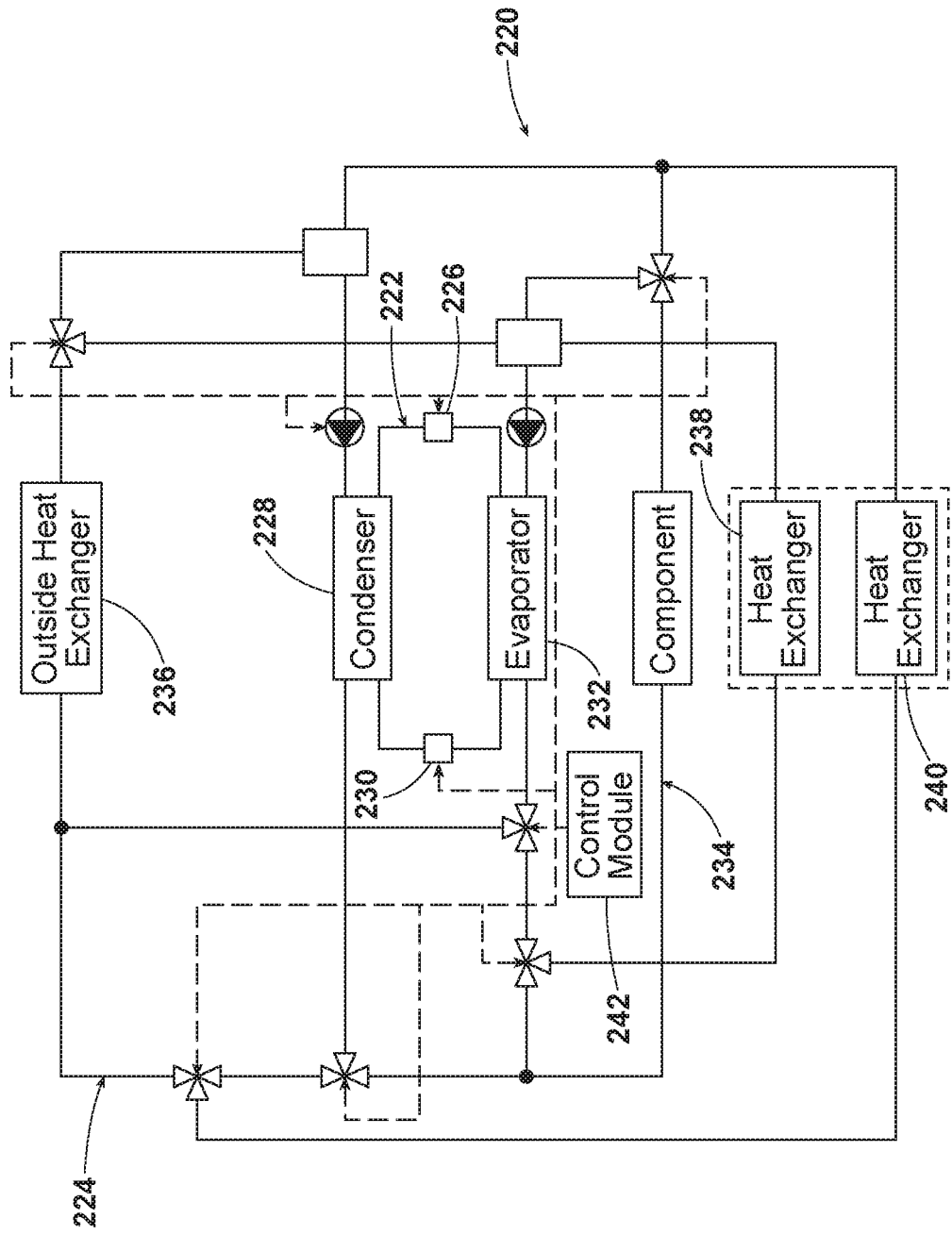
FIG. 11 is a schematic diagram of a second alternate embodiment of the vehicle heating and cooling system having a plurality of regulating valves, including three-way or two-way valves.

FIG. 11 illustrates a schematic diagram of another alternate embodiment of a vehicle heating and cooling system 220 including a primary loop 222 and a secondary loop 224. The primary loop 222 includes at least a compressor, 226, a first refrigerant-to-coolant heat exchanger, or condenser 228, an expansion device 230, and a second refrigerant-to-coolant heat exchanger, or evaporator/chiller, 232. As described above, the primary loop 222 interacts with the secondary loop 224 primarily through heat transfers occurring within the condenser 228 and the evaporator 232. The functionality of the primary loop 222 and its components is described above with regard to the first described embodiment. In addition, the primary loop 222 may also encompass any of the embodiments described in FIG. 2.

As shown, the secondary loop 224 is connected to allow coolant flows to be directed or routed through a plurality of air-to-coolant heat exchangers dependent upon a mode of operation. More specifically, the secondary loop 224 includes a plurality of air-to-coolant heat exchangers, pumps, and an auxiliary coolant loop 234 interconnected to allow the coolant flows to be selectively directed therethrough. The plurality of air-to-coolant heat exchangers includes an outside air-to-coolant heat exchanger 236, referred to as a first air-to-coolant heat exchanger in this embodiment, and second and third air-to-coolant heat exchangers 238, 240, or passenger compartment heat exchangers, and a control module 242 controls the coolant flows dependent upon a mode of operation of the system 220.

In the described alternate embodiment, the secondary loop 224 further includes a plurality of three-way valves to control a first flow of coolant through at least one of the plurality of air-to-coolant heat exchangers 236, 238, 240, and a second flow of coolant through at least one other of the plurality of air-to-coolant heat exchangers dependent upon the mode of operation. The control module 242, as generally described above, controls each of the plurality of three-way valves to direct the first and second flows of coolant, including portions thereof, dependent upon the mode of operation. Throughout the specification, references to a portion could include anywhere from 0% to 100%. For example, a first portion (0%) and a second portion (100%) could be combined in one use and the first portion (50%) and the second portion (50%) could be combined in another use.

Each of the plurality of valves is a three-way valve that may be replaced in alternate embodiments by a series of one-way and/or two-way valves sufficient to direct the coolant flows in desired directions dependent upon the mode of operation. Again, the valves in the series of valves receive signals from and are controlled by the control module 242. The varying directions the valves direct the coolant flows are described in more detail for the various modes of operation below.

Figure 12:
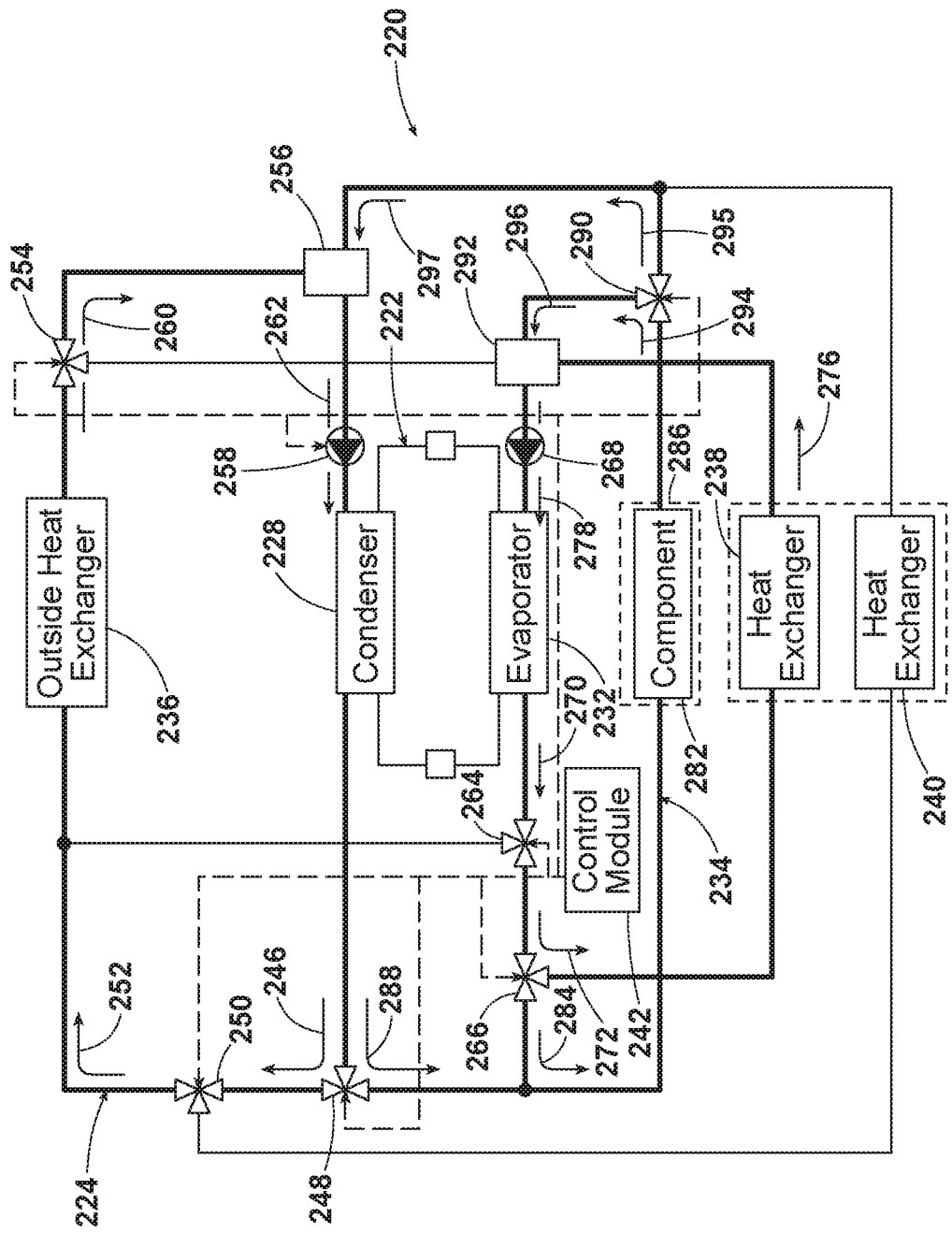
FIG. 12 is a schematic diagram of the second alternate embodiment of the vehicle heating and cooling system having a plurality of regulating valves operating in a cooling mode.

In a cooling mode of operation, as shown in FIG. 12, the secondary loop 224 directs warmed coolant (as shown by action arrows 246 and 252) from the condenser 228 to the first air-to-coolant heat exchanger 236 via first and second three-way valves 248, 250. As indicated above, control module 242 is electrically connected to the intervening three-way valves 248, 250 and signals the three-way valves to direct the warmed coolant to the first air-to-coolant heat exchanger 236. The first air-to-coolant heat exchanger 236 functions as described above in the first embodiment to cool the coolant. Again, cooled coolant is directed by a third three-way valve 254 through an accumulator 256 and drawn back to the condenser 228 by pump 258, as shown by action arrows 260 and 262, in response to a signal from the control module 242.

Also, within the secondary loop 224, cold coolant is directed from the evaporator 232 to the second air-to-coolant heat exchanger 238 via fourth and fifth three-way valves 264, 266. As indicated above, control module 242 is electrically connected to the intervening three-way valves 264, 266 and a pump 268 and signals the three-way valves to direct the cooled coolant to the second air-to-coolant heat exchanger 238 as shown by action arrows 270 and 272.

In the described cooling mode, the second air-to-coolant heat exchanger 238 functions as a cooler in the manner described above for the air-to-coolant heat exchanger 64. Within the second air-to-coolant heat exchanger 238, the cold coolant is warmed due to the heat removed from the air and drawn through an accumulator 292 (as shown by action arrows 276, 278) back to the evaporator 232 by pump 268. In the evaporator 232, the warmed coolant is again cooled by giving its heat to the refrigerant in the primary loop 222, and cycled through the secondary loop 224.

The alternate secondary loop 224 further includes an auxiliary coolant loop 234 for regulating a temperature of at least one component 282 (e.g., a battery pack). While the auxiliary coolant loop 234 provides the ability to cool or warm the component 282, as will be described further below, the component is only cooled in the described cooling mode of operation. Again, this presupposes that the system 220 operates in the cooling mode due to high ambient temperatures that are sufficient to warrant the need for cooling of the component.

Within the secondary loop 224, a portion of the cooled coolant is directed from the evaporator 232 into the auxiliary coolant loop 234, as shown by action arrow 284, via the fourth and fifth three-way valves 264, 266. Prior to entering a compartment 286, the cooled coolant is mixed or blended with a portion of the warmed coolant directed from the condenser 228 into the auxiliary coolant loop 234, as shown by action arrow 288, via the first three-way valve 248. Again, control module 242 is electrically connected to the intervening three-way valves 248, 264, and 266 and signals the three-way valves to direct certain amounts of the warmed and cooled coolants through a compartment 286 housing the component 282. Blending the warmed and cooled coolants allows the system 220 to control a temperature of the coolant entering the compartment. In the cooling mode of operation, the blended coolant flows past the component 282 drawing heat away from the component and warming the coolant. A portion of the warmed coolant is then directed by a sixth three-way valve 290 and drawn through the accumulator 292 by pump 268 to the evaporator 232 as shown by action arrows 294, 296. A remaining portion of the warmed coolant is directed by the sixth three-way valve 290 and drawn through the accumulator 256 by pump 258 to the condenser 228 as shown by action arrows 295, 297. In certain instances, the portion may include all (100%) of the warmed coolant and the remaining portion may include none (0%) of the warmed coolant or vice-versa.

As shown, the warmed coolant from the component is combined with the warmed coolant from the second air-to-coolant heat exchanger 238 in the accumulator 292. As indicated above, control module 242 is electrically connected to the intervening sixth three-way valve 290 and signals the three-way valve to direct the warmed coolant to evaporator 232 via accumulator 292 and/or to condenser 228 via accumulator 256. Whether and in what amounts the warmed coolant is directed to the evaporator 232 and/or the condenser 228 is primarily determined by the portions of warmed/cooled coolant directed into the auxiliary coolant loop 234. In the described embodiment, the amount of coolant returned to the evaporator 232 is equal to that directed by the fifth three-way valve 266 to the auxiliary coolant loop 234. In the evaporator 232, the combined warmed coolant is again cooled by giving its heat to the refrigerant in the primary loop 222, and cycled through the secondary loop 224. Similarly, in the condenser 228, the combined warmed coolant is again heated by absorbing heat from the refrigerant in the primary loop.

Figure 13:
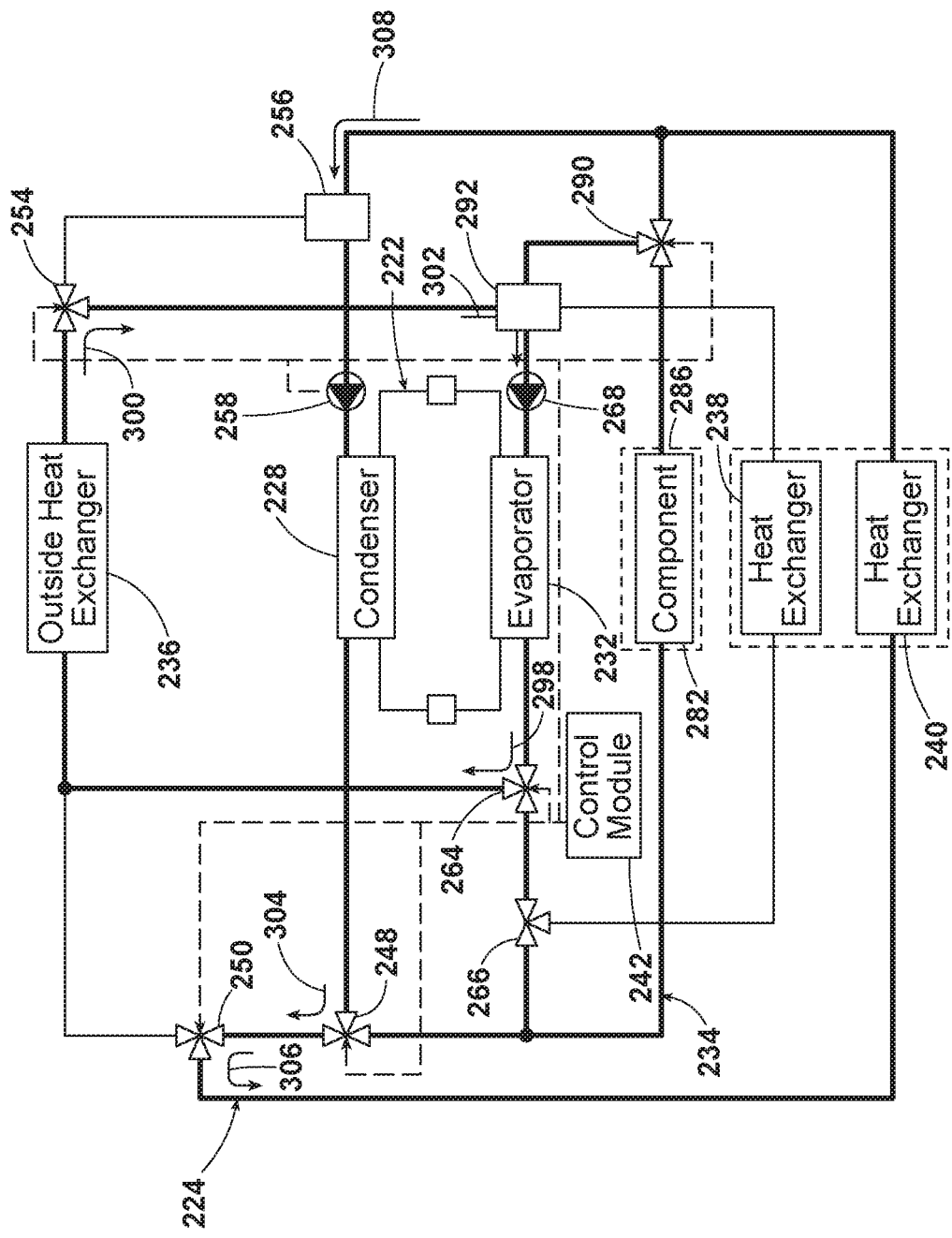
FIG. 13 is a schematic diagram of the second alternate embodiment of the vehicle heating and cooling system having a plurality of regulating valves operating in a heating mode.

In a first heating mode of operation, as shown in FIG. 13, the secondary loop 224 directs cooled coolant from the evaporator 232 to the first air-to-coolant heat exchanger 236 via the fourth three-way valve 264. The control module 242 signals the intervening three-way valve 264 to direct the cooled coolant to the first air-to-coolant heat exchanger 236 as shown by action arrow 298. In the first air-to-coolant heat exchanger 236, the cooled coolant is warmed due primarily to the effect of outside air. The warmed coolant is drawn by pump 268 and directed by the third three-way valve 254 back to the evaporator 232 through accumulator 292 as shown by action arrows 300 and 302. The warmed coolant may be combined with warmed coolant from the auxiliary loop 234 via the sixth three-way valve 290 prior to entering the accumulator 292 if coolant is being pumped through the auxiliary loop. As indicated above, control module 242 is electrically connected to the third and fourth three-way valves 254, 264 and pump 268 and signals the three-way valves accordingly. In the evaporator 232, the combined warmed coolant is again cooled by giving its heat to the refrigerant in the primary loop 222, and cycled through the secondary loop 224.

Also within the secondary loop 224, warmed coolant is drawn through the condenser 228 and directed to the third air-to-coolant heat exchanger 240 via the first and second three-way valves 248, 250 as shown by action arrows 304 and 306. The control module 242 signals the first and second three-way valves 248, 250 to direct the warmed coolant to the third air-to-coolant heat exchanger 240.

In the described heating mode, the third air-to-coolant heat exchanger 240 functions as a heater core in the manner described above for air-to-coolant heat exchanger 66. Within the third air-to-coolant heat exchanger 240, the warm coolant is cooled due to the heat given to the air and drawn back to the condenser 228 through pump 258 and accumulator 256 as shown by action arrow 308. The warmed coolant may be combined with warmed coolant from the auxiliary loop 234 via the sixth three-way valve 290 prior to entering the accumulator 256 if coolant is being pumped through the auxiliary loop. Again, control module 242 is electrically connected to the intervening pump 258 and signals the pump to pump the coolant through the condenser 228. In the condenser 228, the cooled coolant is again warmed by absorbing heat from the refrigerant in the primary loop 222, and cycled through the secondary loop 224.

As described above, the alternate secondary loop 224 includes an auxiliary coolant loop 234 for regulating a temperature of at least one component 282. In the heating mode, the auxiliary coolant loop 234 may be used to cool or warm the component 282 as shown in FIG. 13. As described in detail above, cooled coolant is mixed or blended with warmed coolant prior to entering the compartment 286 housing the component 282. The blended coolant flows past the component 282 drawing heat away from or giving heat to the component and warming or cooling the coolant respectively. The coolant is then directed back to the evaporator 232 and/or the condenser 228 as described above.

Figure 14:
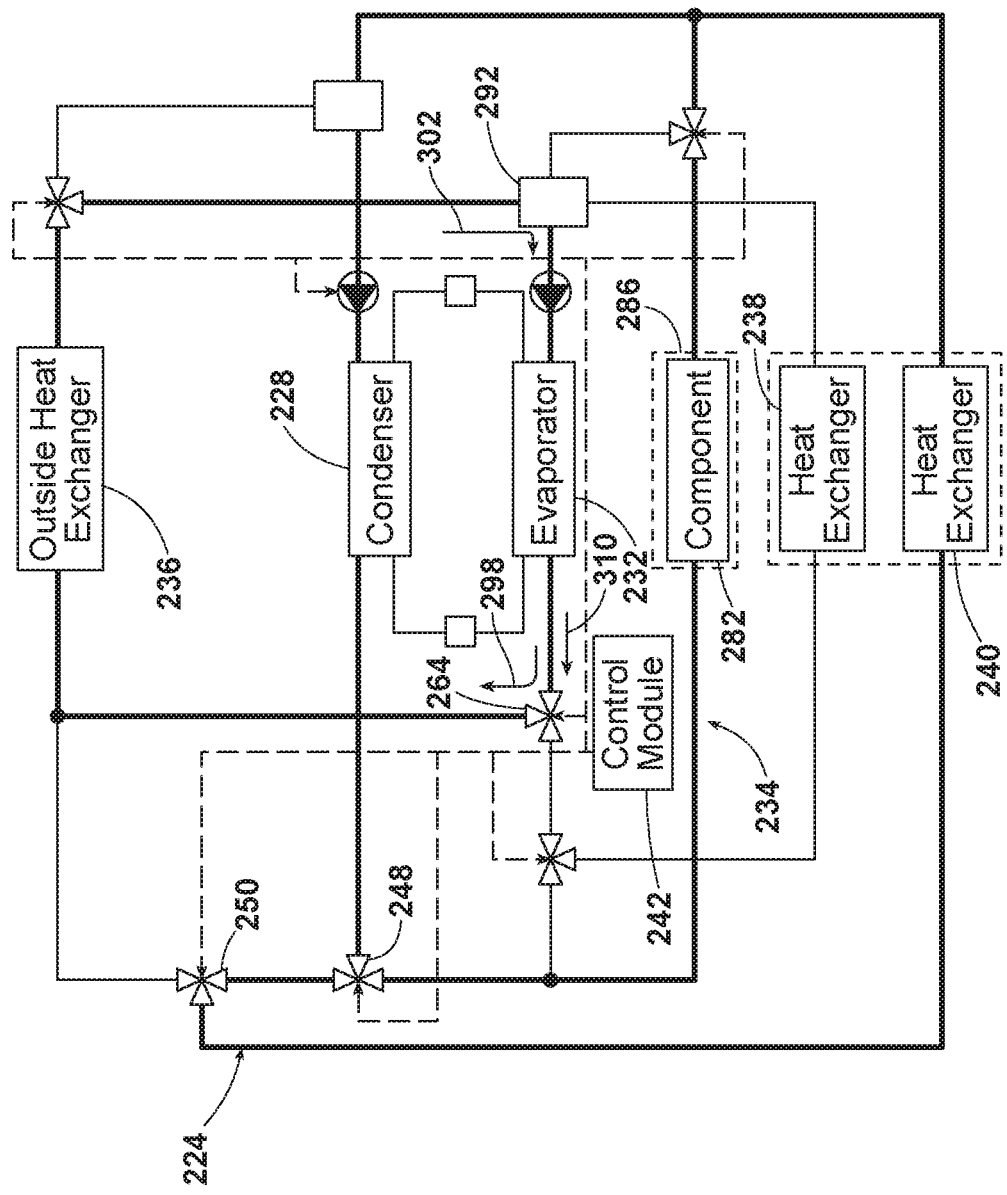
FIG. 14 is a schematic diagram of the second alternate embodiment of the vehicle heating and cooling system having a plurality of regulating valves operating in an alternate heating mode.

In a second heating mode of operation, as shown in FIG. 14, the secondary loop 224 directs cooled coolant from the evaporator 232 solely to the first air-to-coolant heat exchanger 236, as opposed to, the auxiliary loop 234 as in the first heating mode of operation. The control module 242 signals the intervening three-way valve 264 to direct the cooled coolant to the first air-to-coolant heat exchanger 236, as shown by action arrows 298 and 302. In this mode, the at least one component 282 is utilized as a heat sink to which the coolant rejects heat, e.g. battery heating.

Figure 15:
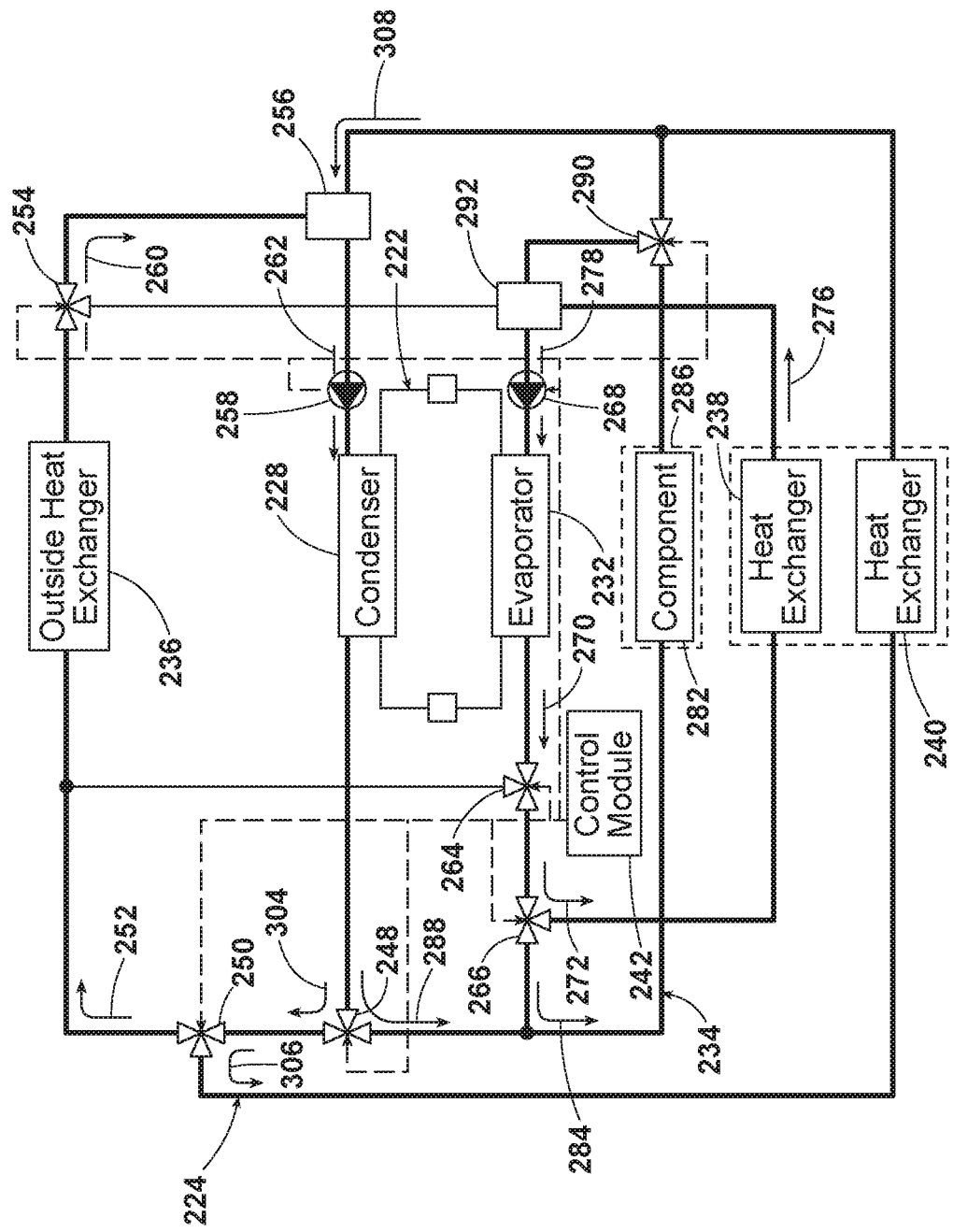
FIG. 15 is a schematic diagram of the second alternate embodiment of the vehicle heating and cooling system having a plurality of regulating valves operating in a dehumidification and reheating mode.

In a first dehumidification and reheat mode of operation, shown in FIG. 15, the secondary loop 224 directs warmed coolant (as shown by action arrow 252) from the condenser 228 to the first air-to-coolant heat exchanger 236 via the first and second three-way valves 248, 250 as in the cooling mode. The first air-to-coolant heat exchanger 236 functions as described above in the first embodiment to cool the coolant. Again, cooled coolant is directed by the third three-way valve 254 to the accumulator 256, as shown by action arrow 260, in response to a signal from the control module 242.

Also within the secondary loop 224, cooled coolant is directed from the evaporator 232 to the second air-to-coolant heat exchanger 238 as shown by action arrows 270 and 272 and warm coolant is concurrently directed from the condenser 228 to the third air-to-coolant heat exchanger 240 as shown by action arrows 304 and 306.

More specifically, the second air-to-coolant heat exchanger 238 functions as a cooler in the manner described above for air-to-coolant heat exchanger 64, and is used to cool and dehumidify the moist, warm air. Within the second air-to-coolant heat exchanger 238, the cooled coolant is warmed due to the heat removed to the air and drawn into accumulator 292 by pump 268. The warmed coolant may be mixed within the accumulator 292 with warmed coolant returning from the auxiliary coolant loop 234 as described above. The mixed coolant is then pumped to the evaporator 232, as shown by action arrow 278, in response to a signal from the control module 242. In the evaporator 232, the coolant is again cooled by giving its heat to the refrigerant in the primary loop 222, and cycled through the secondary loop 224.

The third air-to-coolant heat exchanger 240 functions as a heater core to heat the cooled, dehumidified air and supply tempered or warm air to the passenger compartment. Within the third air-to-coolant heat exchanger 240, the warm coolant is cooled due to the heat removed to the air and drawn into accumulator 256 by pump 258. The warm coolant is mixed within the accumulator 256 with cooled coolant returning from the first air-to-coolant heat exchanger 236, as described above, and may be combined with warmed coolant from the auxiliary loop 234 via the sixth three-way valve 290 prior to being drawn to the condenser 228 by pump 258, as shown by action arrow 308, in response to a signal from the control module 242. In the condenser 228, the mixed coolant is again cooled by giving its heat to the refrigerant in the primary loop 222, and cycled through the secondary loop 224.

In the first dehumidification and reheat mode of operation, the auxiliary coolant loop 234 may operate to cool or warm the component 282. As described in detail above, cooled coolant is directed from the evaporator 232 into the auxiliary coolant loop 234, as shown by action arrow 284, via the fourth and fifth three-way valves 264, 266. Prior to entering the compartment 286, the cooled coolant is mixed or blended with warmed coolant directed from the condenser 228 into the auxiliary coolant loop 234, as shown by action arrow 288, via the first three-way valve 248. Again, control module 242 is electrically connected to the intervening three-way valves 248, 264, and 266 and signals the three-way valves to direct the blended coolant through the compartment 286 housing the component 282. The blended coolant flows past the component 282 drawing heat away from or giving heat to the component and warming or cooling the coolant respectively.

The coolant is then combined with coolant from each of the air-to-coolant heat exchangers 236, 238, and 240 and directed back to the evaporator 232 through accumulator 292 and to the condenser 228 through accumulator 256 as described above. In the evaporator 232, the combined warmed coolant is again cooled by giving its heat to the refrigerant in the primary loop 222, and cycled through the secondary loop 224. Similarly, in the condenser 228, the combined warmed coolant is again heated by absorbing heat from the refrigerant in the primary loop.

Figure 16:
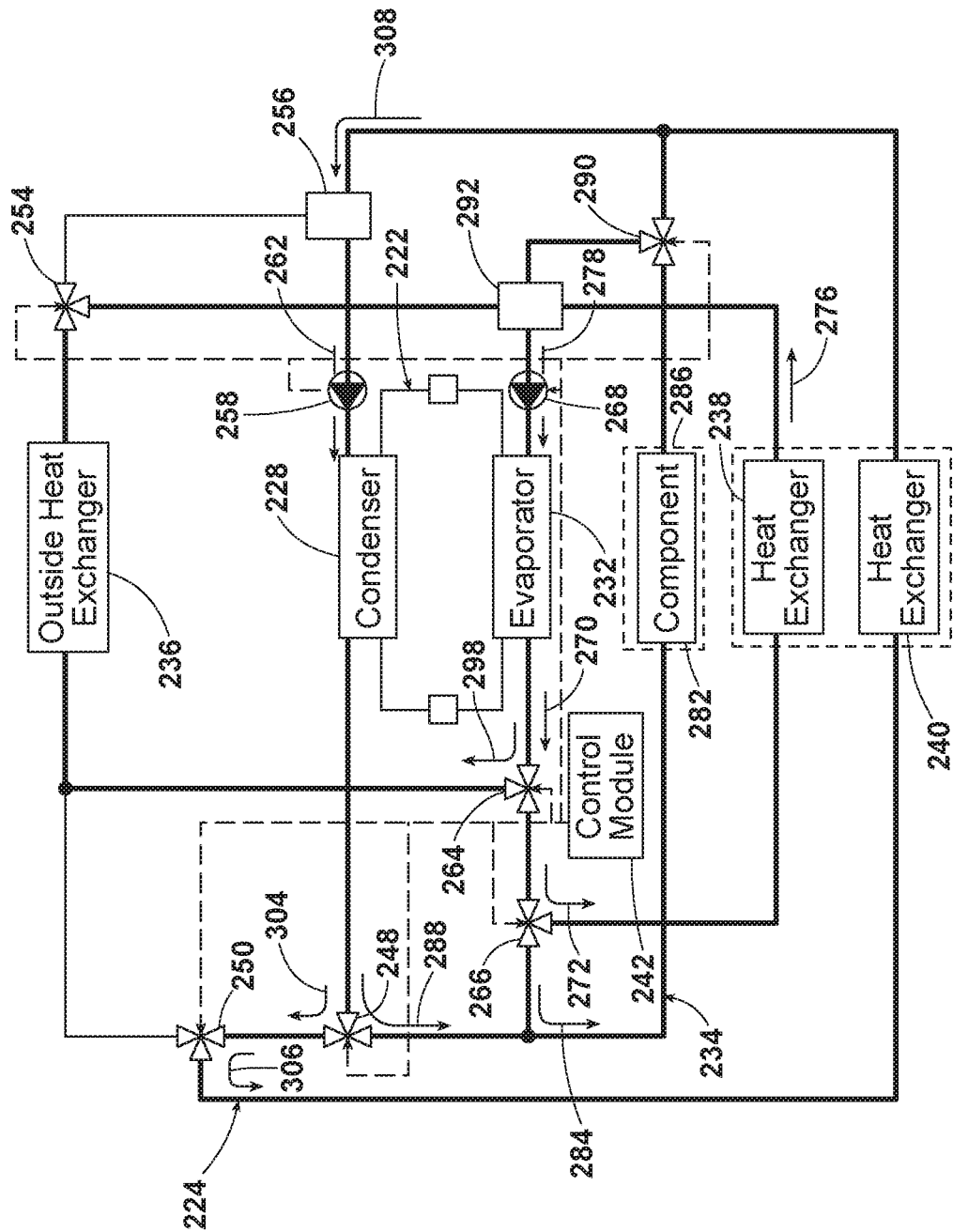
FIG. 16 is a schematic diagram of the second alternate embodiment of the vehicle heating and cooling system having a plurality of regulating valves operating in an alternate dehumidification and reheating mode.

In a second dehumidification and reheating mode of operation, as shown in FIG. 16, the secondary loop 224 does not direct warmed coolant from the condenser 228 to the first air-to-coolant heat exchanger 236 as in the first dehumidification and reheating mode of operation. Rather, the control module 242 signals the intervening three-way valve 264 to direct the cooled coolant from the evaporator 232 to the first air-to-coolant heat exchanger 236 as shown by action arrows 298 and 300.

The auxiliary coolant loop 234 may operate to cool or warm the component 282. As described in detail above, cooled coolant is directed from the evaporator 232 into the auxiliary coolant loop 234, as shown by action arrow 284, via the fourth and fifth three-way valves 264, 266. Prior to entering the compartment 286, the cooled coolant is mixed or blended with warmed coolant directed from the condenser 228 into the auxiliary coolant loop 234, as shown by action arrow 288, via the first three-way valve 248. Again, control module 242 is electrically connected to the intervening three-way valves 248, 264, and 266 and signals the three-way valves to direct the blended coolant through the compartment 286 housing the component 282. The blended coolant flows past the component 282 drawing heat away from or giving heat to the component and warming or cooling the coolant respectively.

The coolant is then combined with coolant from the air-to-coolant heat exchangers 236, 238, and 240 and directed back to the evaporator 232 through accumulator 292 and to the condenser 228 through accumulator 256 as described above. In the evaporator 232, the combined warmed coolant is again cooled by giving its heat to the refrigerant in the primary loop 222, and cycled through the secondary loop 224. Similarly, in the condenser 228, the combined warmed coolant is again heated by absorbing heat from the refrigerant in the primary loop.

Figure 17:
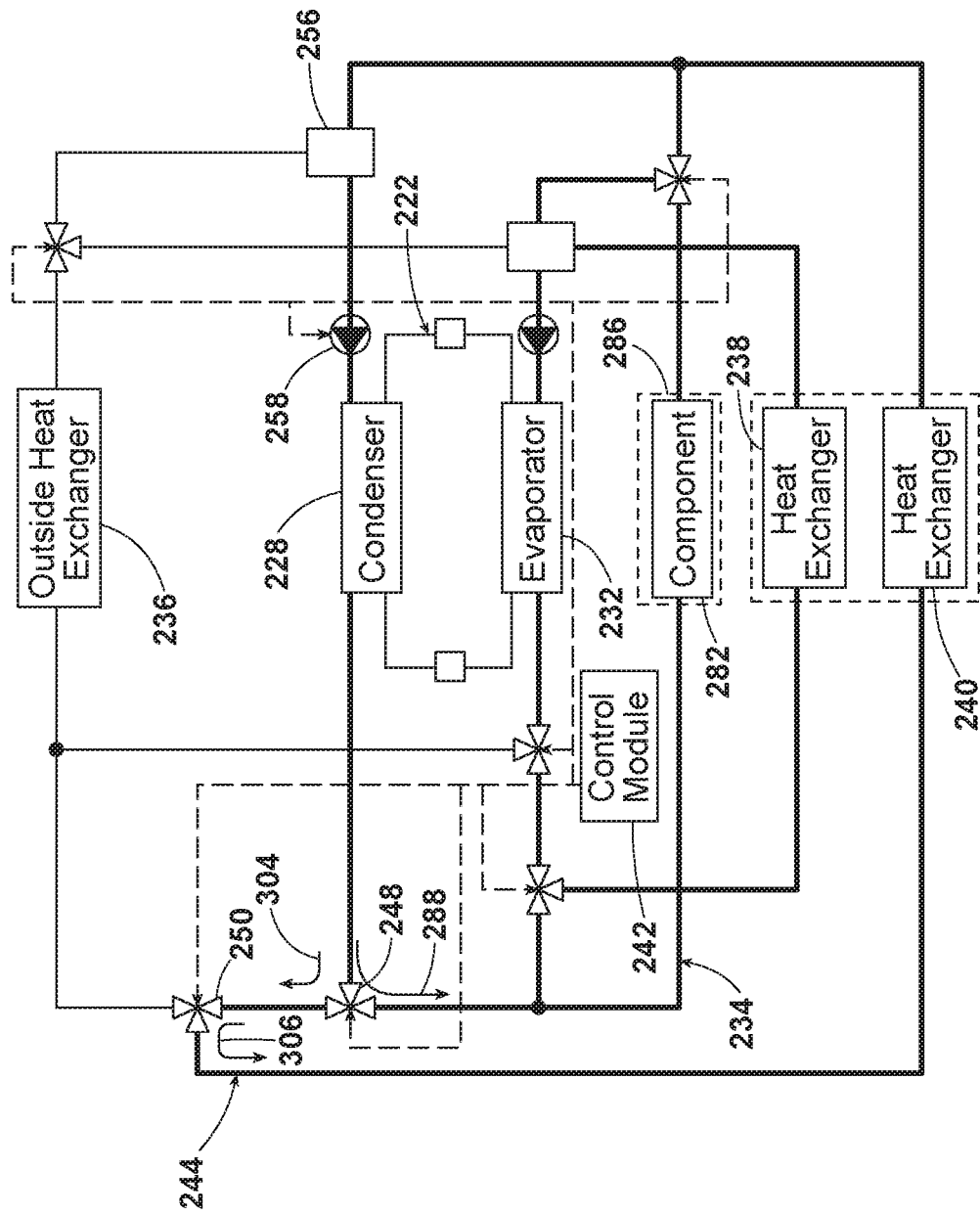
FIG. 17 is a schematic diagram of the second alternate embodiment of the vehicle heating and cooling system having a plurality of regulating valves operating in another alternate dehumidification and reheating mode.

In a third dehumidification and reheating mode of operation, as shown in FIG. 17, the secondary loop 224 does not direct warmed coolant from the condenser 228 to the first air-to-coolant heat exchanger 236 as in the first dehumidification and reheating mode of operation. Rather, the control module 242 signals the intervening three-way valve 250 to direct the warmed coolant to the third air-to-coolant heat exchanger 240 as shown by action arrows 304 and 306. A portion of the warmed coolant from the condenser 228 is also directed by intervening three-way valve 248 to the auxiliary loop 234, as shown by action arrow 288, to be combined with cooled coolant from the evaporator 232 as described above.

In this mode, the at least one component 282 may be utilized as a heat source from which the coolant absorbs heat or as a heat sink to which the coolant rejects heat, dependent upon the ambient and system operating conditions. While generally inconsequential to the operation of the system, this mode allows the vehicle to close its active grille shutters thereby reducing drag and increasing the vehicle's overall efficiency. The remaining functionality of the second dehumidification and reheating mode of operation remains the same as described above for the first mode of operation. The only exception is that the conditioned coolant exiting the at least one component 282 is combined with cooled coolant exiting the third air-to-coolant heat exchanger 240 in the accumulator 256, but not with additional coolant from the first air-to-coolant heat exchanger 236. The combined coolant is drawn through the accumulator 256 back into the condenser 228 by pump 258 and cycled again through the secondary loop 224.

Figure 18:
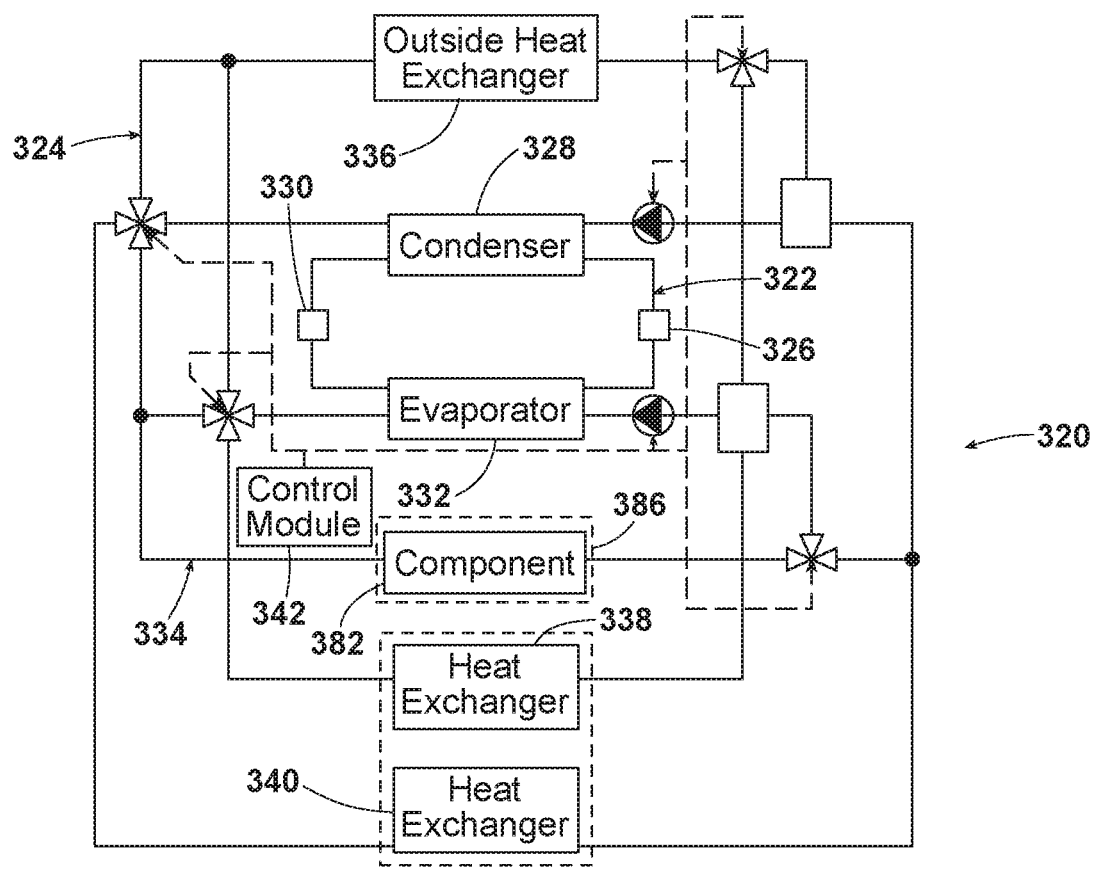
FIG. 18 is a schematic diagram of a third alternate embodiment of the vehicle heating and cooling system having a plurality of regulating valves, including four-way valves.

FIG. 18 illustrates a schematic diagram of still another alternate embodiment of a vehicle heating and cooling system 320 including a primary loop 322 and a secondary loop 324. The primary loop 322 includes at least a compressor, 326, a first refrigerant-to-coolant heat exchanger, or condenser 328, an expansion device 330, and a second refrigerant-to-coolant heat exchanger, or evaporator/chiller, 332. As described above, the primary loop 322 interacts with the secondary loop 324 primarily through heat transfers occurring within the condenser 328 and the evaporator 332. The functionality of the primary loop 322 and its components is described above with regard to the first described embodiment. In addition, the primary loop 322 may also encompass any of the embodiments described in FIG. 2.

As shown, the secondary loop 324 is connected to allow coolant flows to be directed or routed through a plurality of air-to-coolant heat exchangers dependent upon a mode of operation. More specifically, the secondary loop 324 includes a plurality of air-to-coolant heat exchangers, pumps, and an auxiliary coolant loop 334 interconnected to allow the coolant flows to be selectively directed therethrough. The plurality of air-to-coolant heat exchangers includes a first air-to-coolant heat exchanger 336, referred to as a first air-to-coolant heat exchanger in this embodiment, and second and third air-to-coolant heat exchangers 338, 340, or passenger compartment heat exchangers, and a control module 342 controls the coolant flows dependent upon a mode of operation of the system 320.

In the described third alternate embodiment, the secondary loop 324 further includes at least two three-way valves and at least two four-way valves to control a first flow of coolant through at least one of the plurality of air-to-coolant heat exchangers 336, 338, 340, and a second flow of coolant through at least one other of the plurality of air-to-coolant heat exchangers dependent upon the mode of operation. The three-way valves include an inlet and two outlets. Similarly, the four-way valves include an inlet and three outlets. The control module 342, as generally described above, controls each of the three-way and four-way valves to direct the first and second flows of coolant dependent upon the mode of operation.

Each of the plurality of three-way and four-way valves may be replaced in alternate embodiments by a series of one-way, two-way, three-way, and/or four-way valves sufficient to direct the coolant flows in desired directions dependent upon the mode of operation. Again, the valves in the series of valves receive signals from and are controlled by the control module 342. The varying directions the valves direct the coolant flows are described in more detail for the various modes of operation below.

Figure 19:
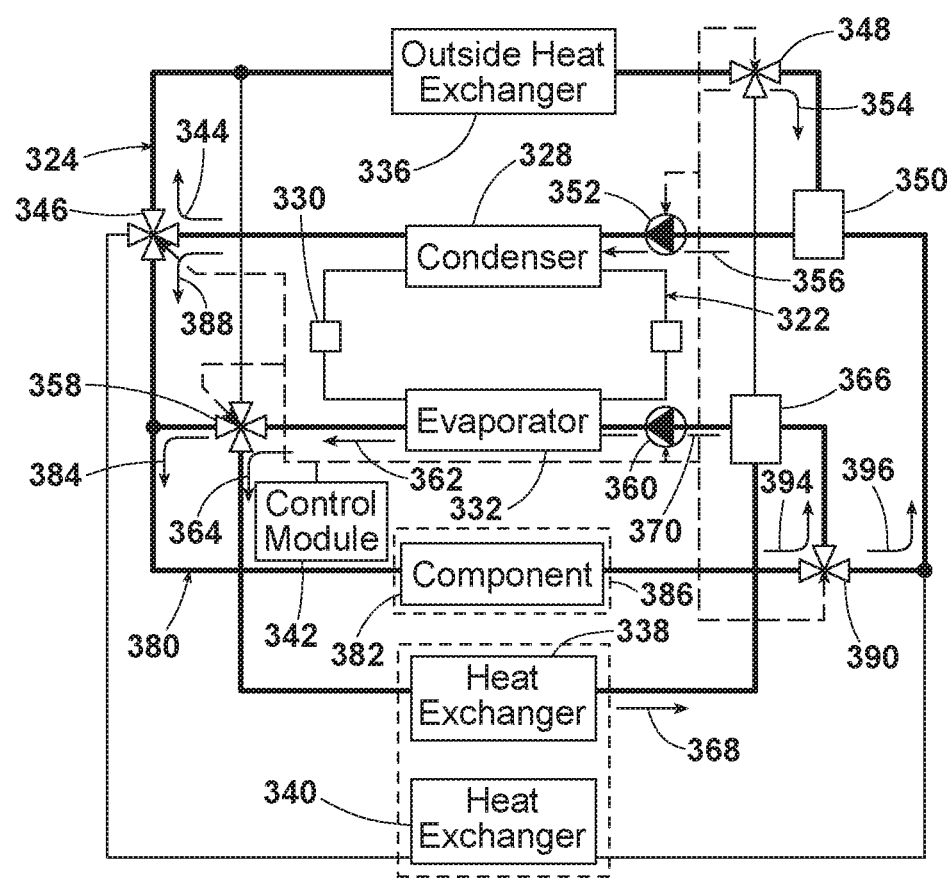
FIG. 19 is a schematic diagram of the third alternate embodiment of the vehicle heating and cooling system having a plurality of regulating valves, including four-way valves, operating in a cooling mode.

In a cooling mode of operation, as shown in FIG. 19, the secondary loop 324 directs warmed coolant (as shown by action arrow 344) from the condenser 328 to the first air-to-coolant heat exchanger 336 via a first four-way valve 346. As indicated above, control module 342 is electrically connected to the intervening four-way valve 346 and signals the four-way valve to direct the warmed coolant to the first air-to-coolant heat exchanger 336. The first air-to-coolant heat exchanger 336 functions as described above in the first embodiment to cool the coolant. Again, cooled coolant is directed by a first three-way valve 348 to an accumulator 350 and drawn back to the condenser 328 by pump 352, as shown by action arrows 354 and 356, in response to a signal from the control module 342.

Also, within the secondary loop 324, cooled coolant is directed from the evaporator 332 to a second air-to-coolant heat exchanger 338 via a second four-way valve 358. As indicated above, control module 342 is electrically connected to the intervening four-way valve 358 and a pump 360 and signals the four-way valve to direct the cooled coolant to the second air-to-coolant heat exchanger 338 as shown by action arrows 362 and 364.

In the described cooling mode, the second air-to-coolant heat exchanger 338 functions as a cooler in the manner described above for the air-to-coolant heat exchanger 64. Within the second air-to-coolant heat exchanger 338, the cooled coolant is warmed due to the heat removed from the air and drawn through an accumulator 366 (as shown by action arrows 368, 370) by pump 360 back to the evaporator 332. In the evaporator 332, the warmed coolant is again cooled by giving its heat to the refrigerant in the primary loop 322, and cycled through the secondary loop 324.

The third alternate secondary loop 324 further includes an auxiliary coolant loop 380 for regulating a temperature of at least one component 382 (e.g., a battery pack). While the auxiliary coolant loop 380 provides the ability to cool or warm the component 382, as will be described further below, the component is only cooled in the described cooling mode of operation. Again, this presupposes that the system 320 operates in the cooling mode due to high ambient temperatures that are sufficient to warrant the need for cooling of the component.

Within the secondary loop 324, cooled coolant is directed from the evaporator 332 into the auxiliary coolant loop 380, as shown by action arrow 384, via the second four-way valve 358. Prior to entering the compartment 386, the cooled coolant is mixed or blended with warmed coolant directed from the condenser 328 into the auxiliary coolant loop 380, as shown by action arrow 388, via the first four-way valve 346. Again, control module 342 is electrically connected to the intervening four-way valves 346 and 358 and signals the four-way valves to direct the blended coolant through the compartment 386 housing the component 382. The blended coolant flows past the component 382 drawing heat away from the component and warming the coolant. A portion of the warmed coolant is then directed by a second three-way valve 390 to the accumulator 366 and drawn by pump 360 to the evaporator 332 as shown by action arrows 394, 370. The remaining portion of the warmed coolant is directed by the second three-way valve 390 and drawn through the accumulator 350 by pump 352 to the condenser 328 as shown by action arrows 396, 356. Again, in certain instances, the portion may include all (100%) of the warmed coolant and the remaining portion may include none (0%) of the warmed coolant or vice-versa.

As shown, the warmed coolant is combined with the warmed coolant from the second air-to-coolant heat exchanger 338 in the accumulator 366. As indicated above, control module 342 is electrically connected to the intervening three-way valve 390 and signals the three-way valve to direct the warmed coolant to evaporator 332 via accumulator 366 and/or to condenser 328 via accumulator 350. In the evaporator 332, the combined warmed coolant is again cooled by giving its heat to the refrigerant in the primary loop 322, and cycled through the secondary loop 324. Similarly, in the condenser 328, the combined warmed coolant is again heated by absorbing heat from the refrigerant in the primary loop 322.

Figure 20:
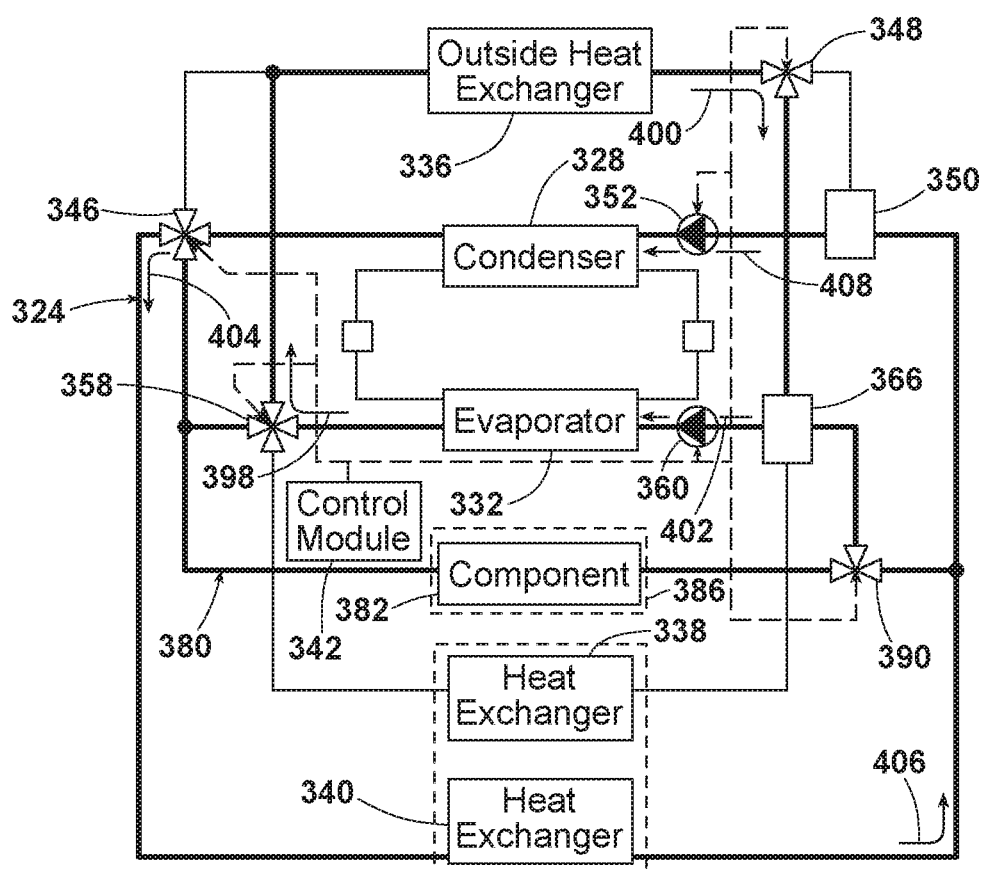
FIG. 20 is a schematic diagram of the third alternate embodiment of the vehicle heating and cooling system having a plurality of regulating valves, including four-way valves, operating in a heating mode.

In a first heating mode of operation, as shown in FIG. 20, the secondary loop 324 directs cooled coolant from the evaporator 332 to the first air-to-coolant heat exchanger 336 via the second four-way valve 358. The control module 342 signals the intervening four-way valve 358 to direct the cooled coolant to the first air-to-coolant heat exchanger 336 as shown by action arrow 398. In the first air-to-coolant heat exchanger 336, the cooled coolant discharged from the evaporator 332 is warmed due primarily to the effect of outside air. The warmed coolant is drawn by pump 360 and directed by the first three-way valve 348 back to the evaporator 332 through accumulator 366 as shown by action arrows 400 and 402. The warmed coolant may be combined with warmed coolant from the auxiliary loop 380 via the second three-way valve 390 prior to entering the accumulator 366 if coolant is being pumped through the auxiliary loop. As indicated above, control module 342 is electrically connected to the first and second three-way valves 348, 390 and pump 360 and signals the three-way valves accordingly. In the evaporator 332, the combined warmed coolant is again cooled by giving its heat to the refrigerant in the primary loop 322, and cycled through the secondary loop 324.

Also within the secondary loop 324, warmed coolant is pumped through the condenser 328 and directed to the third air-to-coolant heat exchanger 340 via the first four-way valve 346 as shown by action arrow 404. The control module 342 signals the first four-way valve 346 to direct the warmed coolant to the third air-to-coolant heat exchanger 340.

In the described heating mode, the third air-to-coolant heat exchanger 340 functions as a heater core in the manner described above for air-to-coolant heat exchanger 66. Within the third air-to-coolant heat exchanger 340, the warm coolant is cooled due to the heat given to the air and drawn back to the condenser 328 by pump 352 through accumulator 350 as shown by action arrows 406, 408. The cooled coolant may be combined with coolant from the auxiliary loop 380 via the second three-way valve 390 prior to entering the accumulator 350 if coolant is being pumped through the auxiliary loop. Again, control module 342 is electrically connected to the pump 352 and signals the pump to pump the coolant through the condenser 328. In the condenser 328, the cooled coolant is again warmed by absorbing heat from the refrigerant in the primary loop 322, and cycled through the secondary loop 324.

As described above, the third alternate secondary loop 324 includes an auxiliary coolant loop 380 for regulating a temperature of at least one component 382. In the heating mode, the auxiliary coolant loop 380 may be used to cool or warm the component 382 as shown in FIG. 20. As described in detail above, cooled coolant is mixed or blended with warmed coolant prior to entering the compartment 386 housing the component 382. The blended coolant flows past the component 382 drawing heat away from or giving heat to the component and warming or cooling the coolant respectively. The coolant is then directed back to the evaporator 332 and/or the condenser 328 as described above.

Figure 21:
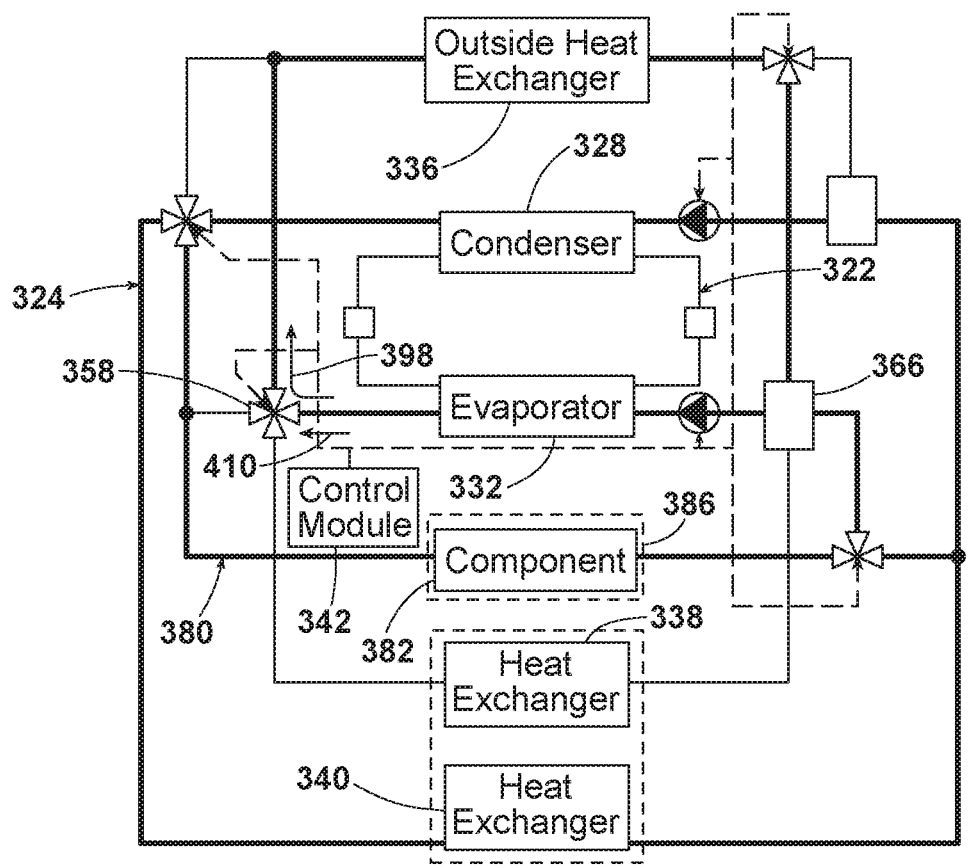
FIG. 21 is a schematic diagram of the third alternate embodiment of the vehicle heating and cooling system having a plurality of regulating valves, including four-way valves, operating in an alternate heating mode.

In a second heating mode of operation, as shown in FIG. 21, the secondary loop 324 only directs cooled coolant from the evaporator 332 to the first air-to-coolant heat exchanger 336, not to the auxiliary loop 380 as in the first heating mode of operation. The control module 342 signals the intervening four-way valve 358 to direct the cooled coolant only to the first air-to-coolant heat exchanger 336, as shown by action arrow 398. In this mode, the at least one component 382 is utilized as a heat sink to which the coolant rejects heat (e.g. for use in battery heating).

Figure 22:
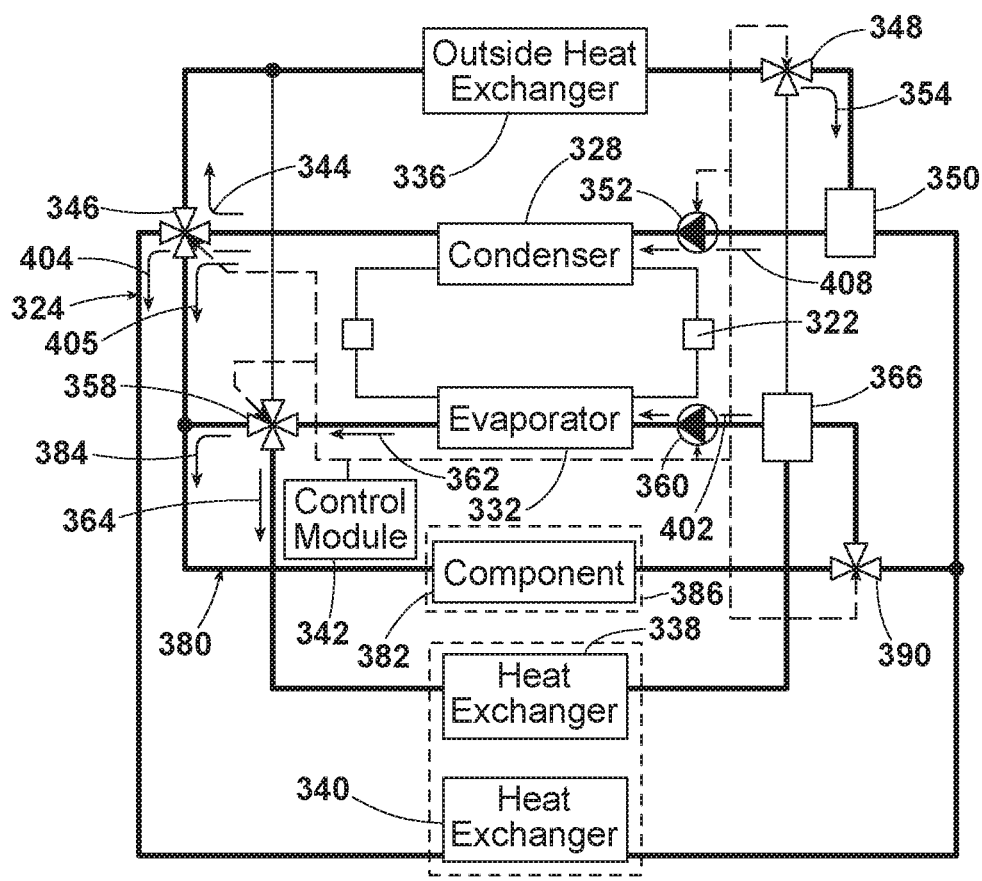
FIG. 22 is a schematic diagram of the third alternate embodiment of the vehicle heating and cooling system having a plurality of regulating valves, including four-way valves, operating in a dehumidification and reheating mode.

In a first dehumidification and reheat mode of operation, shown in FIG. 22, the secondary loop 324 directs warmed coolant (as shown by action arrow 344) from the condenser 328 to the first air-to-coolant heat exchanger 336 via the first four-way valve 346 as in the cooling mode. The first air-to-coolant heat exchanger 336 functions as described above in the first embodiment to cool the coolant. Again, cooled coolant is directed by the first three-way valve 348 to the accumulator 350, as shown by action arrow 354, in response to a signal from the control module 342.

Also within the secondary loop 324, cooled coolant is directed from the evaporator 332 to the second air-to-coolant heat exchanger 338 as shown by action arrows 362 and 364 and warm coolant is concurrently directed from the condenser 328 to the third air-to-coolant heat exchanger 340 as shown by action arrow 404.

More specifically, the second air-to-coolant heat exchanger 338 functions as a cooler in the manner described above for air-to-coolant heat exchanger 64, and is used to cool and dehumidify the moist, warm air. Within the second air-to-coolant heat exchanger 338, the warm coolant is cooled due to the heat removed to the air and drawn into accumulator 366 by pump 360. The warmed coolant is mixed within the accumulator 366 with warmed coolant returning from the auxiliary loop 380 if coolant is being pumped through the auxiliary loop. The mixed coolant is then pumped to the evaporator 332, as shown by action arrow 402, in response to a signal from the control module 342. In the evaporator 332, the coolant is again cooled by giving its heat to the refrigerant in the primary loop 322, and cycled through the secondary loop 324.

The third air-to-coolant heat exchanger 340 functions as a heater core to heat the cooled, dehumidified air and supply tempered or warm air to the passenger compartment. Within the third air-to-coolant heat exchanger 340, the warm coolant is cooled due to the heat removed to the air and drawn into accumulator 350 by pump 352. The warm coolant is mixed within the accumulator 350 with cooled coolant returning from the first air-to-coolant heat exchanger 336, as described above, and may be combined with warmed coolant from the auxiliary loop 380 via the second three-way valve 390 prior to entering the accumulator 350 if coolant is being pumped through the auxiliary loop. The mixed coolant is then pumped to the condenser 328, as shown by action arrow 408, in response to a signal from the control module 342. In the condenser 328, the mixed coolant is again cooled by giving its heat to the refrigerant in the primary loop 322, and cycled through the secondary loop 324.

In the first dehumidification and reheat mode of operation, the auxiliary coolant loop 380 may operate to cool or warm the component 382. As described in detail above, cooled coolant is directed from the evaporator 332 into the auxiliary coolant loop 380, as shown by action arrow 384, via the second four-way valve 358. Prior to entering the compartment 386, the cooled coolant is mixed or blended with warmed coolant directed from the condenser 328 into the auxiliary coolant loop 380, as shown by action arrow 405, via the first four-way valve 346. Again, control module 342 is electrically connected to the intervening four-way valves 346 and 358 and signals the four-way valves to direct the blended coolant through the compartment 386 housing the component 382. The blended coolant flows past the component 382 drawing heat away from or giving heat to the component and warming or cooling the coolant respectively.

The coolant is then combined with coolant from each of the air-to-coolant heat exchangers 336, 338, and 340 and directed back to the evaporator 332 through accumulator 366 and the condenser 328 through accumulator 350 as described above. In the evaporator 332, the combined warmed coolant is again cooled by giving its heat to the refrigerant in the primary loop 322, and cycled through the secondary loop 324. Similarly, in the condenser 328, the combined warmed coolant is again heated by absorbing heat from the refrigerant in the primary loop.

Figure 23:
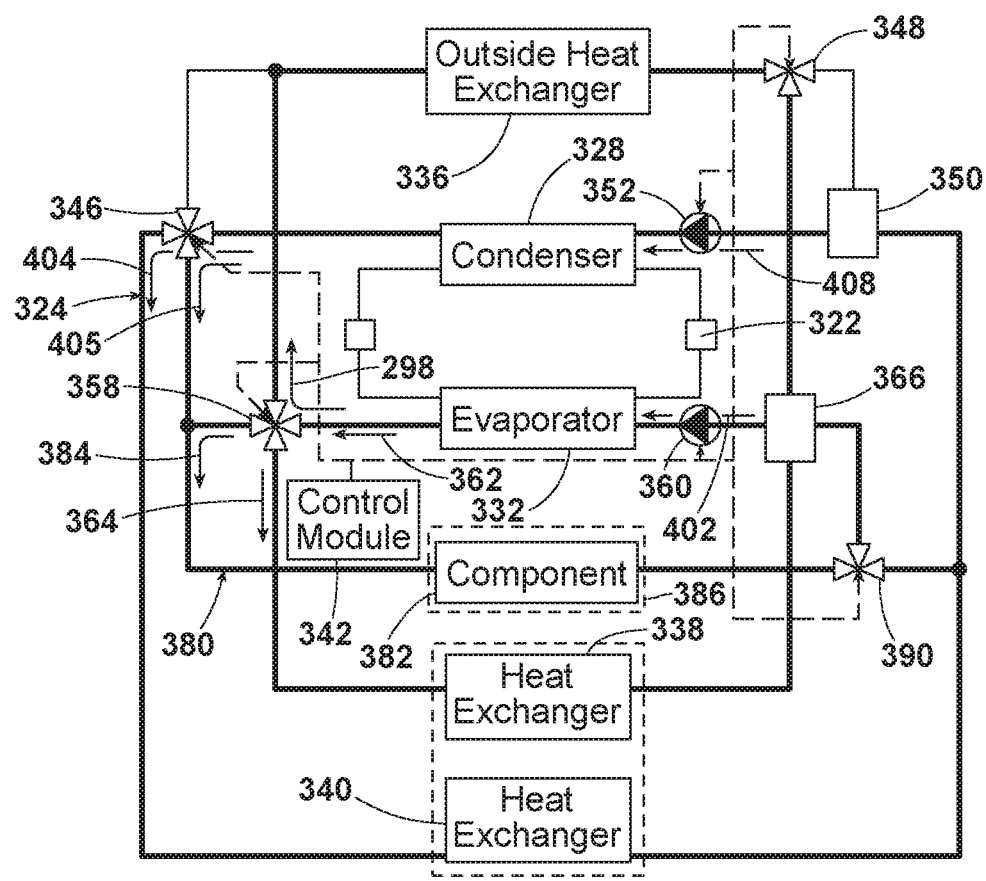
FIG. 23 is a schematic diagram of the third alternate embodiment of the vehicle heating and cooling system having a plurality of regulating valves, including four-way valves, operating in an alternate dehumidification and reheating mode.

In a second dehumidification and reheating mode of operation, as shown in FIG. 23, the secondary loop 324 does not direct warmed coolant from the condenser 328 to the first air-to-coolant heat exchanger 336 as in the first dehumidification and reheating mode of operation. Rather, the control module 342 signals the intervening four-way valve 358 to direct the cooled coolant from the evaporator 332 to the first air-to-coolant heat exchanger 336 as shown by action arrow 398.

The auxiliary coolant loop 380 may operate to cool or warm the component 382. As described in detail above, cooled coolant is directed from the evaporator 332 into the auxiliary coolant loop 380, as shown by action arrow 384, via the second four-way valve 358. Prior to entering the compartment 386, the cooled coolant is mixed or blended with warmed coolant directed from the condenser 328 into the auxiliary coolant loop 380, as shown by action arrow 405, via the first four-way valve 346. Again, control module 342 is electrically connected to the intervening four-way valves 358 and 346 and signals the four-way valves to direct the blended coolant through the compartment 386 housing the component 382. The blended coolant flows past the component 382 drawing heat away from or giving heat to the component and warming or cooling the coolant respectively.

The coolant is then combined with coolant from each of the air-to-coolant heat exchangers 336, 338, and 340 and directed back to the evaporator 332 through accumulator 366 and to the condenser 328 through accumulator 350 as described above. In the evaporator 332, the combined warmed coolant is again cooled by giving its heat to the refrigerant in the primary loop 322, and cycled through the secondary loop 324. Similarly, in the condenser 328, the combined warmed coolant is again heated by absorbing heat from the refrigerant in the primary loop.

Figure 24:
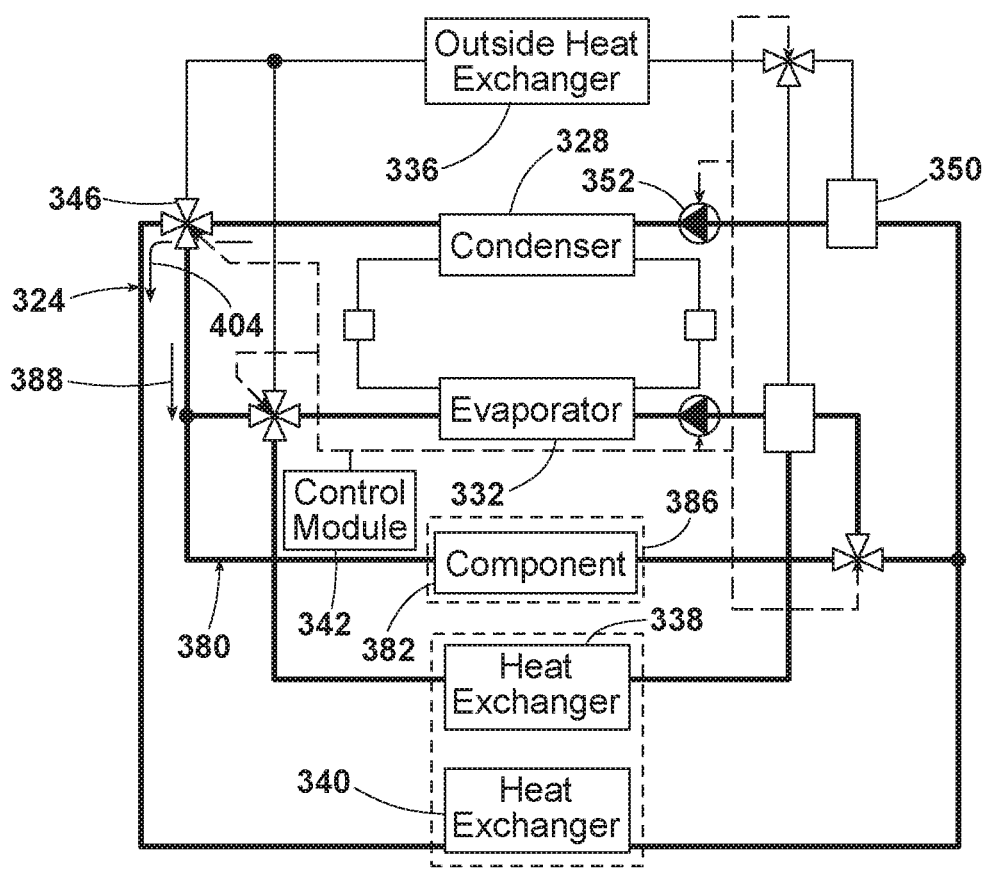
FIG. 24 is a schematic diagram of the third alternate embodiment of the vehicle heating and cooling system having a plurality of regulating valves, including four-way valves, operating in another alternate dehumidification and reheating mode.

In a third dehumidification and reheating mode of operation, as shown in FIG. 24, the secondary loop 324 does not direct warmed coolant from the condenser 328 to the first air-to-coolant heat exchanger 336 as in the first dehumidification and reheating mode of operation. Rather, the control module 342 signals the intervening four-way valve 346 to direct the warmed coolant to the third air-to-coolant heat exchanger 340 as shown by action arrow 404. A portion of the warmed coolant from the condenser 328 is also directed by intervening four-way valve 346 to the auxiliary loop 380, as shown by action arrow 388, to be combined with cooled coolant from the evaporator 332 as described above.

In this mode, the at least one component 382 may be utilized as a heat source from which the coolant absorbs heat or as a heat sink to which the coolant rejects heat, dependent upon the ambient and system operating conditions. While generally inconsequential to the operation of the system, this mode allows the vehicle to close its active grille shutters thereby reducing drag and increasing the vehicle's overall efficiency. The remaining functionality of the second dehumidification and reheating mode of operation remains the same as described above for the first mode of operation. The only exception is that the conditioned coolant exiting the at least one component 382 is combined with cooled coolant exiting the third air-to-coolant heat exchanger 340 prior to passing through the accumulator 350, but not with additional coolant from the first air-to-coolant heat exchanger 336. The combined coolant is drawn through the accumulator 350 back to the condenser 328 by pump 352 and cycled again through the secondary loop 324.

Figure 25:
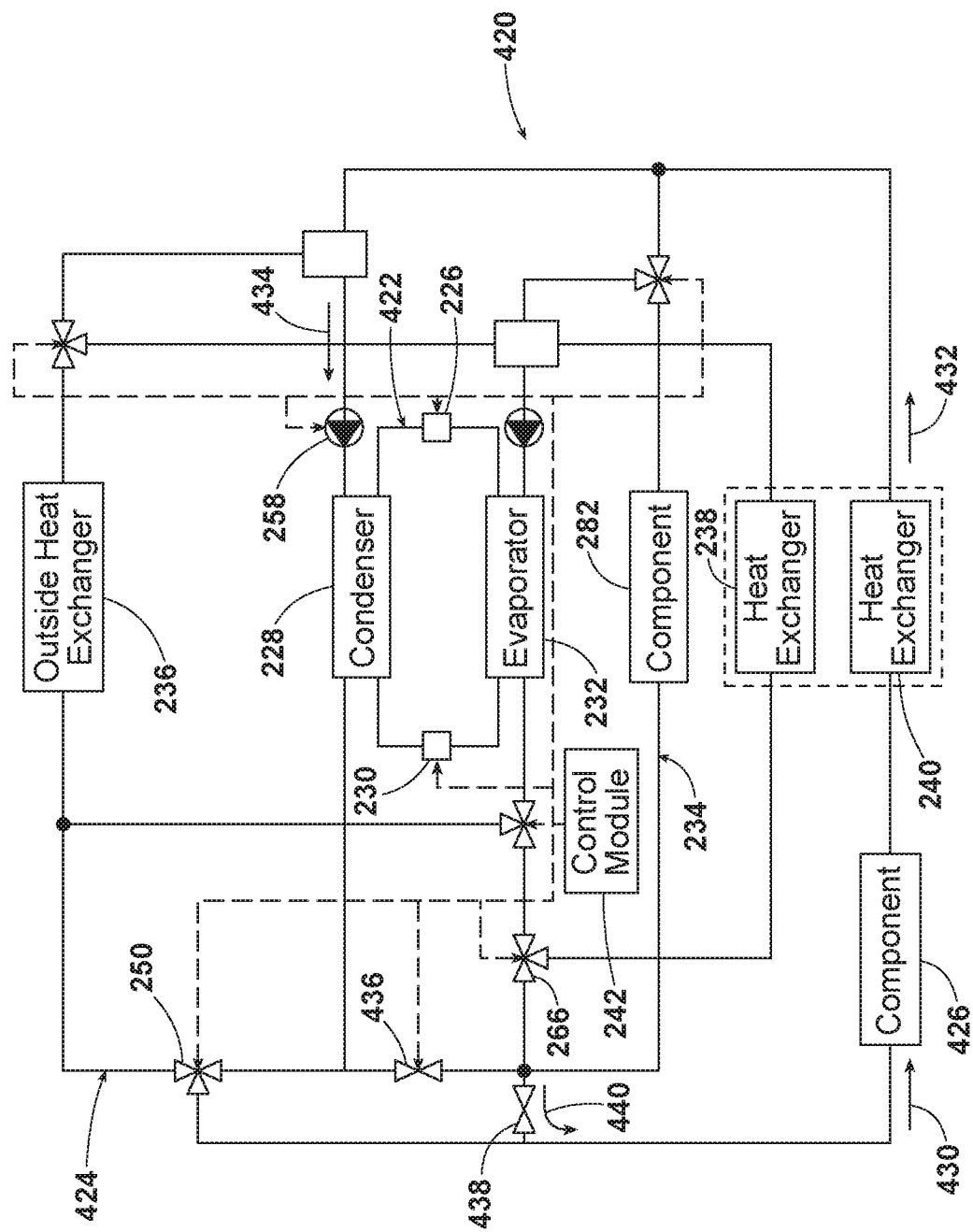
FIG. 25 is a schematic diagram of a fourth alternate embodiment of the vehicle heating and cooling system routing coolant through a second component in order to utilize waste heat.

FIG. 25 illustrates a schematic diagram of still another alternate embodiment of a vehicle heating and cooling system 420 including a primary loop 422 and a secondary loop 424. In this embodiment, the primary loop 422 and the secondary loop 424 function the same as the primary loop 222 and the secondary loop 224 in the system 220. Within the secondary loop 424, however, waste heat from a second component 426 (e.g., non-battery electronic components, such as, an inverter and drive motor) provides additional heat to the system.

As shown, coolant within the secondary loop 424 may flow directly through a compartment (not shown) housing the second component 426 as shown by action arrow 430. The coolant flows past the second component 426 drawing heat away from the component and warming the coolant. The warmed coolant is then drawn through the third air-to-coolant heat exchanger 240 by pump 258 as shown by action arrow 432. The warmed coolant is drawn back to the condenser 228 through the accumulator 256, as shown by action arrow 434 and as described above with regard to the system 220.

Although the coolant within the secondary loop 424 is shown flowing directly through the compartment and past the second component 426, yet another embodiment includes an auxiliary loop that includes the second component. In this embodiment, first and second valves control whether the coolant flows through or bypasses the compartment and second component 426. If there is an insufficient amount of heat within the second component 426, for example at start-up, the control module 242 would signal the first and second valves to allow the auxiliary loop including the second component 426 to be bypassed. The control module 242 may maintain this bypass posture for a predetermined period of time, after start-up or otherwise, or until a monitored temperature associated with the second component 426 reaches a predetermined level. At that time, the control module 242 could signal the first and second valves to direct the flow of coolant through the auxiliary loop.

In addition, valve 248 is removed from the system 220 and a two-way valve 436 is added between the valve 250 and valve 266 and another two-way valve 438 is added between the valve 266 and the second component 426 as shown. This arrangement allows cooled coolant from the evaporator 232 to be directed to the second component 426 in a second component cooling mode of operation. In this mode of operation, the two-way valve 436 is closed and cooled coolant from the evaporator 232 is directed by the two-way valve 438, as shown by action arrow 440, toward the second component 426. The cooled coolant may be mixed with coolant from the condenser 228 prior to flowing past the second component 246 to adjust the coolant temperature or not. Again, the coolant draws heat away from the second component 426 and the warmed coolant is directed back to the condenser 228.

The second component cooling mode of operation may be utilized, for example, during high heat ambient conditions (e.g., ambient temperature >45° C.) in order to limit an upper temperature of the component, for example, to less than 70° C. Other factors can contribute to the need for this mode of operation in place of or in addition to high heat ambient conditions including, for example, high power demands caused by the vehicle climbing hills or towing a load.

FIG. 26 illustrates a schematic diagram of another alternate embodiment of a vehicle heating and cooling system 520 including a primary loop 522 and a secondary loop 524. In this embodiment, the primary loop 522 and the secondary loop 524 function the same as the primary loop 422 and the secondary loop 424 in the system 420. Within the auxiliary coolant loop 234, however, a seventh valve 526 allows for the system to function as described above and shown in FIG. 25 or, with the assistance of pump 528, allows the system to operate in a temperature equalization mode of operation. In the temperature equalization mode of operation, the control module 242 signals the seventh valve 526 to direct the coolant back toward pump 528 as shown by action arrow 530. As shown, the pump 528 draws coolant through the component 282 which coolant is directed by the seventh valve 526 back to the pump such that the coolant is circulated through the auxiliary coolant loop 234. In this manner, a temperature of the component may be equalized across the entirety of the component. If the component were a group of battery cells, for example, circulation of the coolant in the temperature equalization mode of operation would draw heat from one battery cell(s) and give heat to another battery cell(s) thereby equalizing the temperature of each battery cell.

FIG. 27 illustrates a schematic diagram of yet still another alternate embodiment of a vehicle heating and cooling system 620 including a primary loop 622 and a secondary loop 624. In this embodiment, the primary loop 622 and the secondary loop 624 generally function the same as the primary loop 422 and the secondary loop 424 in the system 220. Within the auxiliary coolant loop 234, however, a heater 626 is provided to warm coolant from the evaporator 232 when required to warm the component 282. Since heat is provided by the heater 626 in this embodiment, warm coolant from the condenser 228 is no longer required to be routed through the auxiliary coolant loop 234, whether blended with cooled coolant or not, and back to the condenser. Thus, valves 248 and 290 are able to be removed from the system 620 lowering the number of valves required for system operation and reducing the system footprint. While a second component 426 is shown in dashed line adjacent the third air-to-coolant heat exchanger 240 in FIG. 27, the second component is not required in this embodiment. Even more, as described above, the second component could be in an auxiliary loop with supporting valves (not shown).

The foregoing has been presented for purposes of illustration and description. It is not intended to be exhaustive or to limit the embodiments to the precise form disclosed. Obvious modifications and variations are possible in light of the above teachings. For example, the devices controlled by control module 30 in the described embodiment could be controlled by a plurality of control modules within the vehicle. The plurality of control modules could each control one or more devices within the system and communicate with one another via a controller area network (CAN) bus.

In still other embodiments, the heating and cooling system may not include the thermal management system and/or the system may capture waste heat such as heat drawn away from the component in a heating mode of operation. In such a scenario looking at FIG. 5, for example, warmed coolant exiting the component housing 106 could be directed to the first manifold 70 instead of the first reservoir 68 by activating the third pump 79 through signals from the control module 30. Within the first manifold 70, the coolant warmed by the component would be combined with the warmed coolant from the condenser 20 before being used to warm the passenger compartment via the third air-to-coolant heat exchanger 66 in order to take full advantage of the waste heat of the component 102. All such modifications and variations are within the scope of the appended claims when interpreted in accordance with the breadth to which they are fairly, legally and equitably entitled.

What is claimed:

1. A vehicle having a heating and cooling system, comprising:
   a refrigerant loop having first and second refrigerant-to-coolant heat exchangers;
   a coolant loop having a plurality of valves for directing a first flow of coolant through said first refrigerant-to-coolant heat exchanger, a second flow of coolant through said second refrigerant-to-coolant heat exchanger, and a third flow of coolant including at least one of a first portion of the first flow of coolant exiting said first refrigerant-to-coolant heat exchanger and a first portion of the second flow of coolant exiting said second refrigerant-to-coolant heat exchanger through an auxiliary coolant loop; and a control module for controlling said plurality of valves to direct the flows of coolant dependent upon a mode of operation.

2. The vehicle having the heating and cooling system of claim 1, wherein each of said plurality of valves is a three-way, valve.

3. The vehicle having the heating and cooling system of claim 1, wherein said plurality of air-to-coolant heat exchangers includes at least an outside heat exchanger, and first and second passenger compartment heat exchangers.

4. The vehicle having the heating and cooling system of claim 1, wherein the first flow of coolant is warmed within the first refrigerant-to-coolant heat exchanger and the first portion of the first flow of coolant exiting the first refrigerant-to-coolant heat exchanger is directed through a first valve of said plurality of valves to the auxiliary coolant loop and a second portion of the first flow of coolant exiting the first refrigerant-to-coolant heat exchanger is directed through said first valve of said plurality of valves to a first of said plurality of air-to-coolant heat exchangers for cooling the second portion of the first flow of coolant, and wherein the second flow of coolant is cooled within said second refrigerant-to-coolant heat exchanger and the first portion of the second flow of coolant exiting the second refrigerant-to-coolant heat exchanger is directed through a fifth valve of said plurality of valves to the auxiliary coolant loop and a second portion of the second flow of coolant exiting the second refrigerant-to-coolant heat exchanger is directed through the fifth valve of said plurality of valves to a second air-to-coolant heat exchanger for lowering a temperature within the passenger compartment, in a cooling mode of operation.

5. The vehicle having the heating and cooling system of claim 1, wherein the first flow of coolant is warmed within said first refrigerant-to-coolant heat exchanger and the first portion of the first flow of coolant exiting said first refrigerant-to-coolant heat exchanger is directed through a first valve of said plurality of valves to said auxiliary coolant loop and a second portion of the first flow of coolant exiting said first refrigerant-to-coolant heat exchanger is directed through said first valve of said plurality of valves to a third air-to-coolant heat exchanger for raising a temperature within the passenger compartment, and wherein the second flow of coolant is cooled within said second refrigerant-to-coolant heat exchanger and the first portion of the second flow of coolant exiting said second refrigerant-to-coolant heat exchanger is directed through a fifth valve of said plurality of valves to said auxiliary coolant loop and a second portion of the second flow of coolant exiting said second refrigerant-to-coolant heat exchanger is directed through a fourth valve of said plurality of valves to a first air-to-coolant heat exchanger for warming the second flow of coolant, in a first heating mode of operation.

6. The vehicle having the heating and cooling system of claim 1, wherein the first flow of coolant is warmed within said first refrigerant-to-coolant heat exchanger and the first portion of the first flow of coolant exiting said first refrigerant-to-coolant heat exchanger is directed through a first valve of said plurality of valves to said auxiliary coolant loop and a second portion of the first flow of coolant exiting said first refrigerant-to-coolant heat exchanger is directed through said first valve of said plurality of valves to a third air-to-coolant heat exchanger for raising a temperature within the passenger compartment, and wherein the second flow of coolant is cooled within said second refrigerant-to-coolant heat exchanger and is directed through a fourth valve of said plurality of valves to said first air-to-coolant heat exchanger for warming the second flow of coolant, in a second heating mode of operation.

7. The vehicle having heating and cooling system of claim 1, wherein the first flow of coolant is warmed within said first refrigerant-to-coolant heat exchanger and the first portion of the first flow of coolant exiting said first refrigerant-to-coolant heat exchanger is directed through a first valve of said plurality of valves to said auxiliary coolant loop, a second portion of the first flow of coolant exiting said first refrigerant-to-coolant heat exchanger is directed through a second valve of said plurality of valves to a third air-to-coolant heat exchanger for raising a temperature within the passenger compartment, and a third portion of the first flow of coolant exiting said first refrigerant-to-coolant heat exchanger is directed through said second valve of said plurality of valves to a first air-to-coolant heat exchanger for lowering a temperature of the third portion of the first flow of coolant, and wherein the second flow of coolant is cooled within said second refrigerant-to-coolant heat exchanger and the first portion of the second flow of coolant exiting said second refrigerant-to-coolant heat exchanger is directed through a fifth valve of said plurality of valves to said auxiliary coolant loop and a second portion of the second flow of coolant exiting said second refrigerant-to-coolant heat exchanger is directed through said fifth valve of said plurality of valves to a second air-to-coolant heat exchanger for dehumidifying and lowering a temperature of the passenger compartment, in a first dehumidification and re-heat mode of operation.

8. The vehicle having the heating and cooling system of claim 1, wherein the first flow of coolant is warmed within said first refrigerant-to-coolant heat exchanger and the first portion of the first flow of coolant exiting said first refrigerant-to-coolant heat exchanger is directed through a first valve of said plurality of valves to said auxiliary coolant loop, a second portion of the first flow of coolant exiting said first refrigerant-to-coolant heat exchanger is directed through the first valve of said plurality of valves to a third air-to-coolant heat exchanger for raising a temperature within the passenger compartment, and wherein the second flow of coolant is cooled within said second refrigerant-to-coolant heat exchanger and the first portion of the second flow of coolant exiting said second refrigerant-to-coolant heat exchanger is directed through a fifth valve of said plurality of valves to said auxiliary coolant loop, a second portion of the second flow of coolant exiting said second refrigerant-to-coolant heat exchanger is directed through a fifth valve of said plurality of valves to a second air-to-coolant heat exchanger for dehumidifying and lowering a temperature of the passenger compartment, and a third portion of the second flow of coolant exiting said second refrigerant-to-coolant heat exchanger is directed through a fourth valve of said plurality of valves to a first air-to-coolant heat exchanger for warming the third portion of the second flow of coolant, in a second dehumidification and re-heat mode of operation.

9. The vehicle having the heating and cooling system of claim 1, wherein the first flow of coolant is warmed within said first refrigerant-to-coolant heat exchanger and the first portion of the first flow of coolant exiting said first refrigerant-to-coolant heat exchanger is directed through a first valve of said plurality of valves to said auxiliary coolant loop, and a second portion of the first flow of coolant exiting said first refrigerant-to-coolant heat exchanger is directed through said first valve of said plurality of valves to a third air-to-coolant heat exchanger for raising a temperature within the passenger compartment, and wherein the second flow of coolant is cooled within said second refrigerant-to-coolant heat exchanger and the first portion of the second flow of coolant exiting said second refrigerant-to-coolant heat exchanger is directed through a fifth valve of said plurality of valves to said auxiliary coolant loop and a second portion of the second flow of coolant exiting said second refrigerant-to-coolant heat exchanger is directed through said fifth valve of said plurality of valves to a second air-to-coolant heat exchanger for dehumidifying and lowering a temperature of the passenger compartment, in a third dehumidification and re-heat mode of operation.

10. The vehicle having the heating and cooling system of claim 1, wherein the first flow of coolant is warmed within said first refrigerant-to-coolant heat exchanger and at least a second portion of the first flow of coolant exiting said first refrigerant-to-coolant heat exchanger is directed through said first valve of said plurality of valves past a second component wherein the at least a second portion of the first flow of coolant is warmed.

11. A vehicle having a heating and cooling system, comprising:
a refrigerant loop having first and second refrigerant-to-coolant heat exchangers;
a coolant loop having a plurality of valves for directing a first portion of a first flow of coolant warmed within said first refrigerant-to-coolant heat exchanger through an auxiliary coolant loop and a first portion of a second flow of coolant cooled within said second refrigerant-to-coolant heat exchanger through said auxiliary coolant loop; and
a control module for controlling said plurality of valves to direct the first and second flows of coolant dependent upon a mode of operation.

12. The vehicle having the heating and cooling system of claim 11, wherein said plurality of air-to-coolant heat exchangers includes at least an outside heat exchanger, and first and second passenger compartment heat exchangers.

13. The vehicle, having the heating and cooling system of claim 11, wherein the first portion of said first flow of coolant warmed within said first refrigerant-to-coolant heat exchanger is directed through a first valve of said plurality of valves to said auxiliary coolant loop and a second portion of the first flow of coolant warmed within said first refrigerant-to-coolant heat exchanger is directed through said first valve of said plurality of valves to a first air-to-coolant heat exchanger for cooling the first flow of coolant, and wherein the first portion of said second flow of coolant cooled within said second refrigerant-to-coolant heat exchanger is directed through a third valve of said plurality of valves to said auxiliary coolant loop and a second portion of the second flow of coolant cooled within said second refrigerant-to-coolant heat exchanger is directed through said third valve of said plurality of valves to a second air-to-coolant heat exchanger for lowering a temperature within the passenger compartment, in a cooling mode of operation.

14. The vehicle having the heating and cooling system of claim 11, wherein the first portion of the first flow of coolant warmed within said first refrigerant-to-coolant heat exchanger is directed through a first valve of said plurality of valves to said auxiliary coolant loop and a second portion of the first flow of coolant warmed within said first refrigerant-to-coolant heat exchanger is directed through said first valve of said plurality of valves to a third air-to-coolant heat exchanger for raising a temperature within the passenger compartment, and wherein the first portion of the second flow of coolant cooled within said second refrigerant-to-coolant heat exchanger is directed through a third valve of said plurality of valves to said auxiliary coolant loop and a second portion of the second flow of coolant cooled within said second refrigerant-to-coolant heat exchanger is directed through said third valve of said plurality of valves to a first air-to-coolant heat exchanger for warming the second flow of coolant, in a first heating mode of operation.

15. The vehicle having the heating and cooling system of claim 11, wherein the first portion of the first flow of coolant warmed within said first refrigerant-to-coolant heat exchanger is directed through a first valve of said plurality of valves to said auxiliary coolant loop and a second portion of the first flow of coolant warmed within said first refrigerant-to-coolant heat exchanger is directed through said first valve of said plurality of valves to a third air-to-coolant heat exchanger for raising a temperature within the passenger compartment, and wherein a second portion of the second flow of coolant cooled within said second refrigerant-to-coolant heat exchanger includes the entirety of the second flow of coolant cooled within said second refrigerant-to-coolant heat exchanger and is directed through the third valve of said plurality of valves to said first air-to-coolant heat exchanger for warming the second flow of coolant in a second heating mode of operation.

16. The vehicle having the heating and cooling system of claim 11, wherein the first portion of the first flow of coolant warmed within said first refrigerant-to-coolant heat exchanger is directed through a first valve of said plurality of valves to said auxiliary, coolant loop, a second portion of the first flow of coolant warmed within said first refrigerant-to-coolant heat exchanger is directed said first valve of said plurality of valves to a third air-to-coolant heat exchanger for raising a temperature within the passenger compartment, and a third portion of the first flow of coolant warmed within said first refrigerant-to-coolant heat exchanger is directed through said first valve of said plurality of valves to a first air-to-coolant heat exchanger for lowering a temperature of the third portion of the first flow of coolant, and wherein a first portion of the second flow of coolant cooled within said second refrigerant-to-coolant heat exchanger is directed through a third valve of said plurality of valves to said auxiliary coolant loop and a second portion of the second flow of coolant cooled within said second refrigerant-to-coolant heat exchanger is directed through said second valve of said plurality of valves to a second air-to-coolant heat exchanger for dehumidifying and cooling the passenger compartment, in a first dehumidification and re-heat mode of operation.

17. The vehicle having the heating and cooling system of claim 11, wherein the first flow of coolant is warmed within said first refrigerant-to-coolant heat exchanger and the first portion of the first flow of coolant warmed within said first refrigerant-to-coolant heat exchanger is directed through a first valve of said plurality of valves to said auxiliary coolant loop and a second portion of the first flow of coolant warmed said first refrigerant-to-coolant heat exchanger is directed through said first valve of said plurality of valves to a third air-to-coolant heat exchanger for raising a temperature within the passenger compartment, and wherein the second flow of coolant is cooled within said second refrigerant-to-coolant heat exchanger and the first portion of the second flow of coolant cooled within said second refrigerant-to-coolant heat exchanger is directed through a third valve of said plurality of valves to said auxiliary coolant loop, a second portion of the second flow of coolant cooled within said second refrigerant-to-coolant heat exchanger is directed through said third valve of said plurality of valves to a second air-to-coolant heat exchanger for dehumidifying and lowering a temperature of the passenger compartment, and a third portion of the second flow of coolant cooled within said second refrigerant-to-coolant heat exchanger is directed through said third valve of said plurality of valves to a first air-to-coolant heat exchanger for warming the third portion of the second flow of coolant, in a second dehumidification and re-heat mode of operation.

18. The vehicle having the heating and cooling system, of claim 11, wherein the first portion of the first flow of coolant warmed within said first refrigerant-to-coolant heat exchanger is directed through a first valve of said plurality of valves to said auxiliary coolant loop, and a second portion of the first flow of coolant warmed within said first refrigerant-to-coolant heat exchanger is directed through said first valve of said plurality of valves to a third air-to-coolant heat exchanger for raising a temperature within the passenger compartment, and wherein the first portion of the second flow of coolant cooled within said second refrigerant-to-coolant heat exchanger is directed through a third valve of said plurality of valves to said auxiliary coolant loop and a second portion of the second flow of coolant cooled within said second refrigerant-to-coolant heat exchanger is directed through said third valve of said plurality of valves to a second air-to-coolant heat exchanger for dehumidifying and cooling the passenger compartment, in a third dehumidification and re-heat mode of operation.

19. A method of heating and cooling a component of a vehicle, comprising the steps of:
cycling a refrigerant through a refrigerant loop having first and second refrigerant-to-coolant heat exchangers;
directing a first coolant flow through said first refrigerant-to-coolant heat exchanger and a second coolant flow through said second refrigerant-to-coolant heat exchanger within a coolant loop; and
adjusting a temperature of a third coolant flow through an auxiliary coolant loop including the component by blending a first portion of the first coolant flow warmed within said first refrigerant-to-coolant heat exchanger and a first portion of the second coolant flow cooled within said second refrigerant-to-coolant heat exchanger to form the third coolant flow.

20. The method of heating and cooling the component of the vehicle of claim 19, further comprising the step of controlling at least one of said directing and adjusting steps dependent upon a mode of operation.

21. The method of heating and cooling the component of the vehicle of claim 20, wherein the second portion of the second flow of coolant cooled within said second refrigerant-to-coolant heat exchanger includes the entirety of the second flow of coolant cooled within said second refrigerant-to-coolant heat exchanger in a heating mode of operation.

* * * * *

UNITED STATES PATENT AND TRADEMARK OFFICE
CERTIFICATE OF CORRECTION

PATENT NO. : 10,343,487 B2
APPLICATION NO. : 15/801673
DATED : July 9, 2019
INVENTOR(S) : Koberstein et al.

Page 1 of 1

It is certified that error appears in the above-identified patent and that said Letters Patent is hereby corrected as shown below:

In the Claims

Column 31, Line 9, please replace "three-way, value" with --- three-way value ---, Column 34, Line 25, please replace "flow of coolant in" with --- flow of coolant, in ---, Column 34, Line 31, please replace "auxiliary, coolant loop" with --- auxiliary coolant loop ---, Column 34, Line 33, please replace "exchanger is directed said" with --- exchanger is directed through said ---.

Signed and Sealed this
Eleventh Day of February, 2020

Andrei Iancu
*Director of the United States Patent and Trademark Office*